United States Patent
Oishi et al.

[11] Patent Number: 6,141,490
[45] Date of Patent: Oct. 31, 2000

[54] DATA MULTIPLEXING METHOD AND RECORDING MEDIUM

[75] Inventors: Noriaki Oishi; Katsumi Tahara, both of Kanagawa; Mikita Yasuda, Tokyo; Shinji Negishi, Kanagawa, all of Japan

[73] Assignee: Sony Corporation, Tokyo, Japan

[21] Appl. No.: 08/865,944

[22] Filed: May 30, 1997

[30] Foreign Application Priority Data

Jun. 7, 1996 [JP] Japan .................................. 8-145359

[51] Int. Cl.$^7$ .................................................. H04N 5/928
[52] U.S. Cl. ............................................. 386/98; 386/96
[58] Field of Search .............................. 386/98, 96, 104, 386/109, 46, 39, 40, 113, 124, 66, 92, 100, 112; 348/512, 515; 360/32; H04N 5/928

[56] References Cited

U.S. PATENT DOCUMENTS 5,583,652  12/1996  Ware .......................................... 386/75

*Primary Examiner*—Robert Chevalier
*Attorney, Agent, or Firm*—Frommer Lawrence & Haug, LLP.; William S. Frommer; Joe H. Shallenburger

[57] ABSTRACT

A multiplexed stream MBa is formed by multiplexing at step S1. In switching to given ones of N multiplexed streams MBb, buffer occupation information in an end portion of MBa is detected at step S2. At step S3, buffer quasi-amounts in a head portion of the given ones of MBb are detected and the given ones of MBb are formed by multiplexing such that the buffer quasi-amounts are not exceeded. At step S4, a locus of the maximum value of the buffer occupation amounts by the N streams MBb in their end portion is detected. At step S5, a multiplexed stream MBc is formed by multiplexing such that the locus of the maximum value of the occupation amounts is not exceeded.

4 Claims, 19 Drawing Sheets

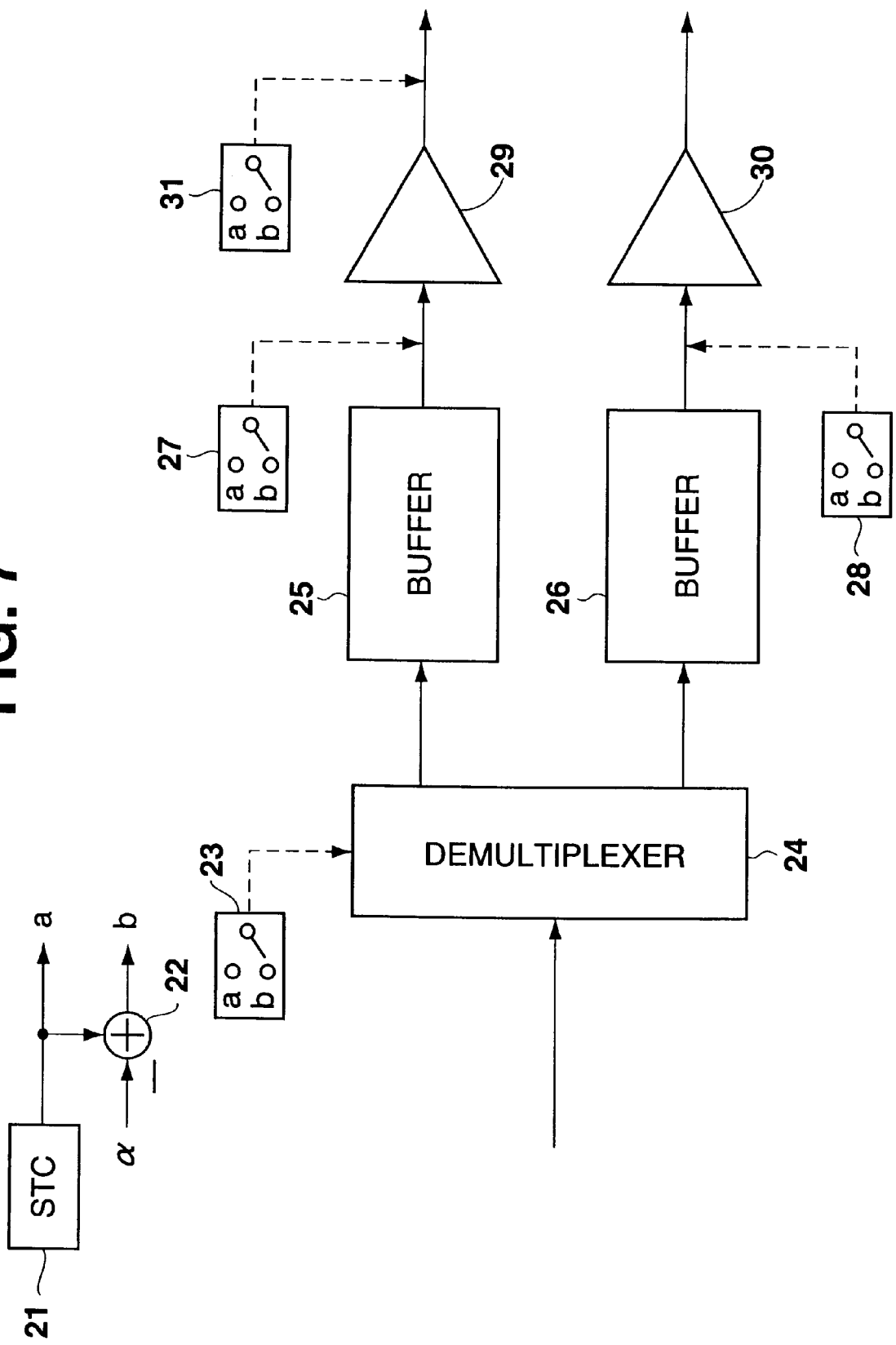

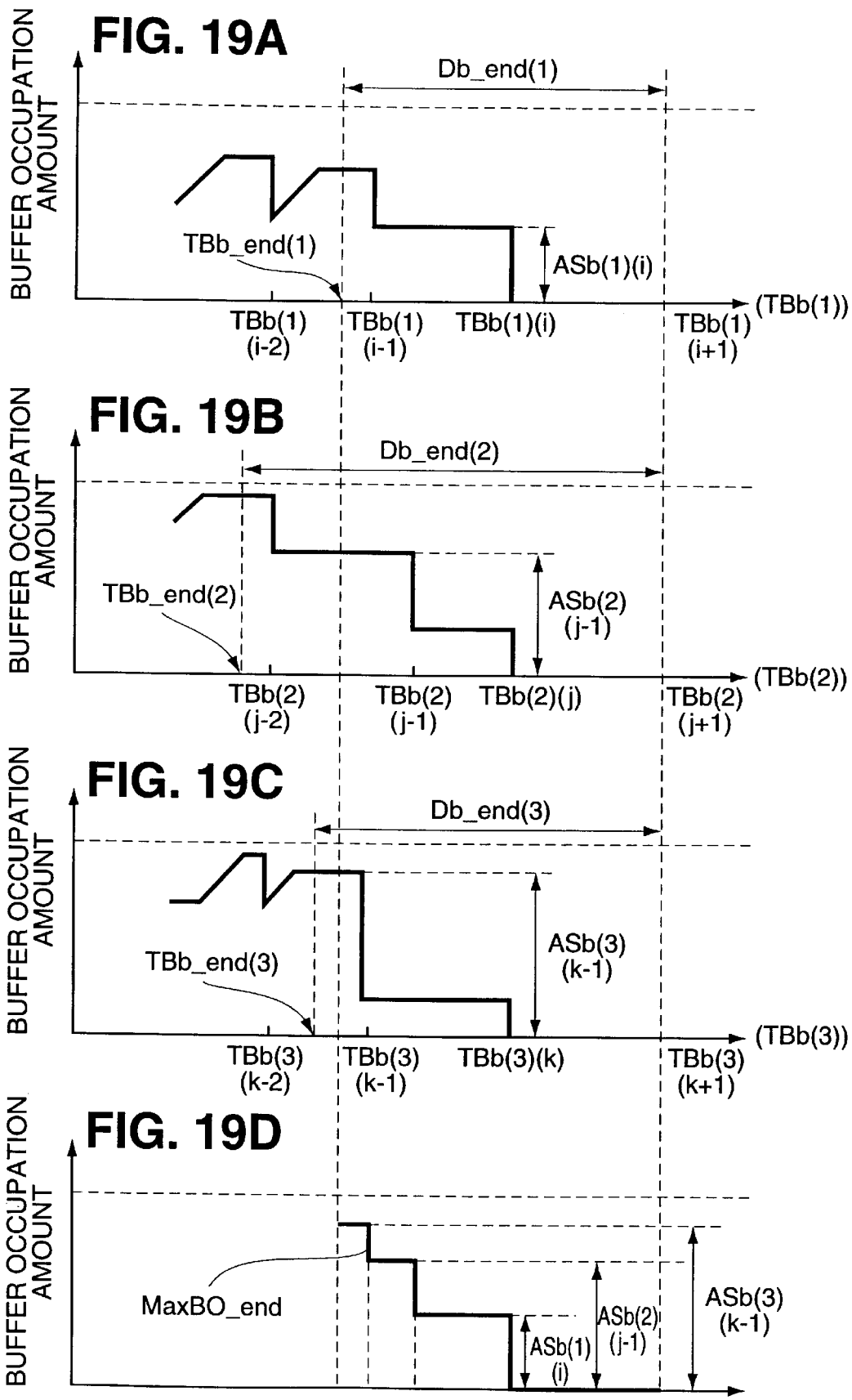

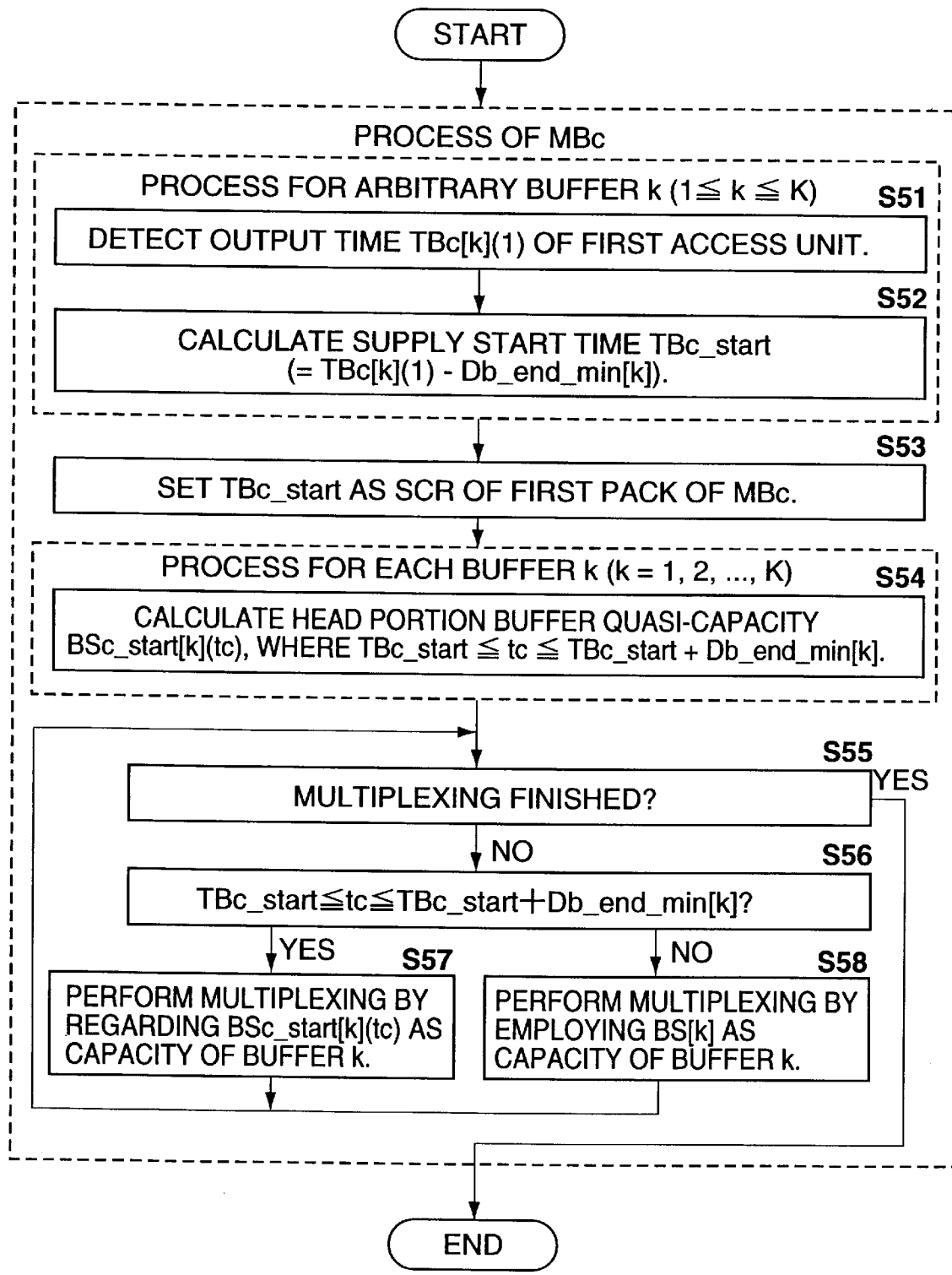

DATA MULTIPLEXING METHOD AND RECORDING MEDIUM

BACKGROUND OF THE INVENTION

1. Field of the Invention

The present invention relates to a data multiplexing method and a recording medium. For example, the invention relates to a data multiplexing method and a recording medium in which when a plurality of multiplexed streams each consisting of a plurality of signals of video, audio, and the like are input to a decoding apparatus and are reproduced therein in a switched manner, a failure in a buffer memory of the decoding apparatus can be prevented.

2. Description of the Related Art

FIG. 1 shows an example of configuration of a transmission/reception system for transmitting and receiving signals of video, audio, and the like. On the transmission side (coding apparatus), a video encoder 1 encodes an input video signal and an audio encoder 2 encodes an input audio signal. A multiplexer 3 multiplexes coded video data and audio data that are supplied from the video encoder 1 and the audio encoder 2, respectively.

A multiplexed signal that is output from the multiplexer 3 is recorded onto a recording medium 4 such as a recordable DVD (digital versatile disc) or transmitted on a transmission line 5.

On the reception side (decoding apparatus), a demultiplexer 6 demultiplexes coded and multiplexed data that is supplied via the recording medium 4 or the transmission line 5 into video data, audio data, and the like, i.e., data of respective types. A video decoder 7 decodes coded video data that is supplied from the demultiplexer 6 and outputs decoded video data. An audio decoder 8 decodes coded audio data that is supplied from the multiplexer 6 and outputs decoded audio data.

For example, on the transmission side, input signals of video, audio, and the like are respectively coded by the video encoder 1 and the audio encoder 2 and then supplied to the multiplexer 3. The coded video data and audio data are multiplexed (combined into single data), and then supplied to and recorded onto the recording medium 4 or transmitted on the transmission line 5 to the reception side.

On the reception side, coded and multiplexed video and audio data that was recorded on the recording medium 4 or has been transmitted on the transmission line 5 is supplied to the demultiplexer 6, where it is demultiplexed into video data, audio data, and the like, i.e., data of respective types. That is, video data and audio data are reconstructed. The reconstructed video data is supplied to the video decoder 7 and decoded therein. The reconstructed audio data is supplied to the audio decoder 8 and decoded therein. Decoded video data and audio data are output in a synchronized manner.

The MPEG (moving picture experts group) systems (ISO/IEC 13818-1 and ISO/IEC 11172-1) are international standards relating to schemes for multiplexing and demultiplexing coded data of video, audio, and the like in the above-described manner. In the following, coded data of video, audio, or the like is called an "elementary stream." In particular, coded data of a video signal is called a "video stream," and coded data of an audio signal is called an "audio stream." Further, multiplexed data of a plurality of elementary streams is called a "multiplexed stream."

To simplify the description, the following description is directed to only multiplexed streams of an MPEG1 (ISO/IEC 11172-1) system stream and an MPEG2 (ISO/IEC 13818-1) program stream. However, the techniques under consideration can also be applied to an MPEG2 transport stream.

FIG. 2 shows the structure of a multiplexed stream prescribed in the MPEG systems. As shown in FIG. 2, a multiplexed stream consists of a plurality of packs. Each pack is given a pack header, which describes such information as a SCR (system clock reference; described later) and a multiplexing rate (Mux_rate; described later). Each pack consists of a plurality of packets; elementary streams of video, audio, and the like are inserted in an individual pack in a divided manner. Each packet is given a packet header, which describes a time stamp (described later) and other data.

FIG. 3 shows an example of configuration of a decoding apparatus to which a multiplexed stream demultiplexing method that is prescribed in the MPEG systems is applied. This demultiplexing method is a method using imaginary decoders and is called a STD (system target decoder) model. Its operation will be described below.

The STD model has, in its inside, a reference clock STC (system time clock) 11, which increases at every constant cycle. Each pack header of a multiplexed stream that is input to the STD model describes a system time reference value called SCR (system clock reference).

Input of a multiplexed stream to the STD model is controlled by using the STC and the SCR. That is, at an instant when a readout SCR value becomes equal to an STC value, input of the pack whose pack header describes the SCR value is started. The input rate at this time, which is called a multiplexing rate, is described in the pack header.

The demultiplexer 12 sorts out a plurality of packets of each input pack into respective kinds of packets (a video stream, an audio stream, and the like). Video streams are supplied to a buffer (decoding buffer) 13 while audio streams are supplied to a buffer (decoding buffer) 14.

Data of video streams, audio streams, and the like stored in the buffers 13 and 14 are output therefrom on an access unit basis (access unit: the decoding unit of an elementary stream) based on time information (time stamp) that is described in each packet header. Those data are decoded by a video decoder 15 and an audio decoder 16, and then output for reproduction. In the following, the video decoder 15 and the audio decoder 16 are simply called the decoders 15 and 16 when they need not be distinguished from each other.

There are two kinds of time stamps, i.e., DTS (decoding time-stamp) and PTS (presentation time-stamp). The DTS indicates a time when an access unit is output from the buffer 13 or 14 and decoded by the decoder 15 or 16. The PTS indicates a time when a decoded access unit is output for reproduction. The timing of decoding and output is controlled by comparing a DTS or PTS value with a STC value. It is assumed that there occurs no delay in transfer of each access unit from the buffer 13 or 14 as well as decoding in the decoder 15 or 16, that is, such operations are performed instantaneously.

In general, in given elementary streams in which DTS and PTS values are equal to each other, only the PTS value is described in a packet header. Examples of such elementary streams are MPEG audio streams (ISO/IEC 13818-3 and ISO/IEC 11172-3). In the case of MPEG video streams (ISO/IEC 13818-2 and ISO/IEC 11172-2), a decoding delay occurs depending on the kind of access unit. Therefore, in this case, time stamps of both DTS and PTS are described. A rearrangement buffer 17 is a buffer for temporarily storing an I-picture and a P-picture and rearranging data by performing delay control.

An SCR value is a sample value of a reference clock (time base) provided in the coding apparatus (including the multiplexer). The use of the SCR enables input/output control in each buffer (buffer 13 or 14) of the decoding apparatus (STD model). It is required that SCR values be properly set in the coding apparatus so that the decoding in the STD model can be performed without causing in an overflow (data supplied to a buffer exceeds its capacity) or an underflow (not all data of an access unit has not reached a buffer at a time point when it should be decoded) in any buffer.

An application example using a plurality of multiplexed streams is "multiple-path reproduction." The multiple-path reproduction is a function of performing "language credit" (language-dependent video reproduction), "director's cut" (a cut designated by a movie director such as a parental lock), "multi-angles" (pictures taken by a plurality of cameras), and the like, and realizes reproduction of multiple paths according to a user's selection by means of a single application.

FIG. 4 shows an example of multiple-path reproduction. This example is a case including three reproduction paths. Arrows in FIG. 4 indicate that one of the three reproduction paths (i.e., reproduction path-3) is selected for reproduction. Each reproduction path consists of a plurality of multiplexed streams each of which was generated based on an independent time base. Multiplexed streams MBa and MBc are common to all the reproduction paths, and selection can be made among three multiplexed streams MBb(1) to MBb(3) which are located between MBa and MBc. For example, reproduction path-1 is formed by continuous reproduction of the three multiplexed streams MBa, MBb(1), and MBc. Reproduction path-2 and reproduction path-3 are formed in similar manners.

For example, respective multiplexed streams of the multiple-path reproduction of FIG. 4 are recorded or transmitted according to an arrangement and an order shown in FIG. 5. The decoding apparatus controls input of the respective multiplexed streams in accordance with a selected reproduction path. FIG. 5 shows an example of a reproduction order that is employed when reproduction path-2 is selected in FIG. 4, and arrows indicate that data may be skipped on a multiplexed stream basis.

Where the input is controlled in the above manner, actually data of multiplexed streams are input to the decoding apparatus in order of MBa, MBb(2), and MBc, as shown in FIG. 6. In the following, a connection point between adjacent multiplexed streams is hereinafter called a "discontinuous point" of multiplexed streams.

The above-described STD model does not assume continuous input of multiplexed streams that were generated based on time bases independent of each other. Therefore, it is impossible to reproduce such multiplexed streams without occurrence of any failure in the buffers in the vicinity of discontinuous points. In view of this, it is conceivable to use an E-STD model shown in FIG. 7 which is an extended version of the STD model.

In the E-STD model shown in FIG. 7, switches 23, 27, 28, and 31 for enabling input of packs, decoding of respective elementary streams, and switching among reference clocks to be referred to in output control in the vicinity of a discontinuous point of continuously input multiplexed streams are added to the STD model of FIG. 3. The STC is input, as a reference clock, to terminal a of the respective switches 23, 27, 28, and 31 while STC-α is input to terminal b thereof.

However, it is assumed that in singly reproducing each of multiplexed streams (MBa and MBb) before and after a discontinuous point, connection is made of terminal a in all the switches 23, 27, 28, and 31 and the E-STD model operates in the same manner as the STD model.

When connection is made to terminal b in all the switches 23, 27, 28, and 31, a STC-α value is referred to as a reference clock as shown in FIG. 7. As described below, a proper value is set as a variable α.

For example, the value of the variable a may be set so that a decoding time of the last access unit of a preceding video stream MBa plus its display (i.e., output) cycle coincides with a display (i.e., output) time of the first access unit of an ensuing video stream MBb plus the value of the variable α.

The switch 23 operates to perform input control of respective packs of a multiplexed stream. At a discontinuous point of multiplexed streams, the connection of the switch 23 is changed to terminal b at a time instant when the last pack of a preceding multiplexed stream MBa is input to the demultiplexer 24. Thereafter, the input of respective packs is controlled by comparing a value of the reference clock (STC-α) that is input to terminal b with a SCR value that is described in each pack header of an ensuing multiplexed stream MBb.

The switch 27 operates to perform decoding control. At a discontinuous point, the connection of the switch 27 is changed to terminal b at a time point that is a time point when the last access unit of a video stream of a preceding multiplexed stream MBa is decoded by the video decoder 29 plus its decoding cycle. Thereafter, the decoding is controlled based on values of the reference clock (STC-α) that is input to terminal b and DTS values of video streams included in an ensuing multiplexed stream MBb.

The switch 31 operates to perform display control on video streams. At a discontinuous point, the connection of the switch 31 is changed to terminal b at a time point that is a time point when the last access unit of a video stream of a preceding multiplexed stream MBa is displayed plus its display cycle. Thereafter, the display is controlled based on values of the reference clock (STC-α) that is input to terminal b and PTS values of video streams included in an ensuing multiplexed stream MBb.

The switch 28 operates to control output of audio streams. At a discontinuous point, the connection of the switch 31 is changed to terminal b at a time point that is a time point when the last access unit of an audio stream of a preceding multiplexed stream MBa is displayed plus its display cycle. Thereafter, the output is controlled based on values of the reference clock (STC-α) that is input to terminal b and PTS values of audio streams included in an ensuing multiplexed stream MBb.

At an instant when the connections of all the switches 23, 27, 28, and 31 are changed to terminals b, the STC value is re-set to a value of the reference clock (STC-α) that is input to terminal b and, at the same time, the connections of all the switches 23, 27, 28, and 31 are changed to terminals a. Thereafter, the same control as in the case of the STD model is performed.

Even in the E-STD model, the buffer (decoding buffer) 25 or the buffer 26 (decoding buffer) in the STD model may fails at a discontinuous point of multiplexed streams. Such a case will be described below. It is assumed that multiplexed streams before and after a discontinuous point are denoted by MBa and MBb, and that they were generated based on independent time bases TBa and TBb.

In the following description, it is assumed that TBa(i), for instance, a time based on the time base TBa and represents a time when an ith access unit is output from a subject buffer. A time when data supply to all the buffers (i.e., buffers 25 and 26) is finished in singly reproducing the multiplexed stream MBa is assumed to be time TBa_end which is based on the time base TBa. Further, a data supply start time in singly reproducing the multiplexed stream MBb is assumed to be time TBb_start which is based on the time base TBb.

FIGS. 8A–8C show an example of an overflow in a buffer (buffer 25 or 26) of the E-STD model. The vertical axis represents the buffer occupation amount and the horizontal axis represents the time. FIGS. 8A and 8B relate to the same buffer of the E-STD model, and show variations in the buffer occupation amounts according to the time bases TBa and TBb in singly reproducing the multiplexed streams MBa and MBb, respectively.

FIG. 8A shows only an end portion of the multiplexed stream MBa while FIG. 8B shows only a head portion of the multiplexed stream MBb. It is assumed that as shown in FIGS. 8A and 8B each multiplexed stream was formed by multiplexing so as to assure that data is supplied without causing a failure in a buffer in singly reproducing it.

FIG. 8C shows a variation in the buffer occupation amount according to the time base TBa when the multiplexed streams MBa and MBb are reproduced continuously. As seen from FIG. 8C, at an instant (time TBa_end) when data supply of the multiplexed stream MBa is finished, data supply of the multiplexed stream MBb is started. There is a problem that a buffer overflow may thereafter occur at time TBa_overflow which is based on the time base TBa.

This is caused by the fact that the data supply of the multiplexed stream MBb is scheduled irrespective of (independently of) that of the multiplexed stream MBa; that is, in multiplexing to form the multiplexed stream MBb no consideration is made of how the buffer is occupied as data, particularly of an end portion, of the preceding multiplexed stream MBa is supplied.

FIGS. 9A–9C show an example of an underflow in a buffer (buffer 25 or 26) of the E-STD model. The vertical axis represents the buffer occupation amount and the horizontal axis represents the time. FIGS. 9A and 9B relate to the same buffer of the E-STD model as in the case of FIGS. 8A and 8B, and show variations in the buffer occupation amounts according to the time bases TBa and TBb in singly reproducing the multiplexed streams MBa and MBb, respectively.

FIG. 9A shows only an end portion of the multiplexed stream MBa while FIG. 9B shows only a head portion of the multiplexed stream MBb. It is assumed that as shown in FIGS. 9A and 9B each multiplexed stream MBa or MBb was formed by multiplexing so as to assure that data is supplied without causing a failure in a buffer in singly reproducing it.

FIG. 9C shows a variation in the buffer occupation amount according to the time base TBa when the multiplexed streams MBa and MBb are reproduced continuously. As seen from FIG. 9C, at an instant (time TBa_end) when data supply of the multiplexed stream MBa is finished, data supply of the multiplexed stream MBb is started.

However, when the next access unit (ASb(1): the first access unit of the multiplexed stream MBb) is output at time TBa(n+1), not all data of the access unit ASb(1) has not reached the buffer. Therefore, there is a problem that a buffer underflow may occur at time TBa(n+1).

This is because the data supply of the multiplexed stream MBa is finished too late, which delays the start of the data supply of the multiplexed stream MBb, which in turn prevents the data of the first access unit ASb(1) of the multiplexed stream MBb from arriving in time. Time TBa (n+1) is time TBa(n) when the last access unit of the multiplexed stream MBa is output from the buffer plus its decoding cycle.

SUMMARY OF THE INVENTION

The present invention has been made in view of the above circumstances in the art, and an object of the invention is to prevent a decoding buffer from failing at a discontinuous point of multiplexed streams in multiple-path reproduction.

According to a first aspect of the invention, there is provided a data multiplexing method for multiplexing data for a reproducing apparatus which performs multiple-path reproduction by inputting given ones of a plurality of multiplexed streams that are based on different time bases to a decoding apparatus while switching among the given multiplexed streams at a given timing, wherein control is so performed that supply of the data to a buffer memory of the decoding apparatus is made earlier in such a range that an overflow does not occur in the buffer memory. With this data multiplexing method, the degree of freedom in determining the supply start time of an ensuing multiplexed stream to the buffer memories can be increased, whereby a buffer memory failure can be prevented when a plurality of multiplexed streams are reproduced while being switched.

According to a second aspect of the invention, there is provided a data multiplexing method for multiplexing data for a reproducing apparatus which performs multiple-path reproduction by inputting given ones of a plurality of multiplexed streams that are based on different time bases to a decoding apparatus while switching among the given multiplexed streams at a given timing, comprising the steps of detecting occupation amounts of buffer memories of the decoding apparatus for storing a multiplexed stream in an end portion of a first given one of the plurality of multiplexed streams which precedes a second given one of the plurality of multiplexed streams; imaginarily setting capacities of the buffer memories which can store the second given multiplexed stream based on the detected occupation amounts; and performing control so that the second given multiplexed stream is supplied to the respective memories such that the imaginarily set capacities of the buffer memories are not exceeded. With this data multiplexing method, a buffer memory failure can be prevented when a plurality of multiplexed streams are reproduced while being switched.

According to a third aspect of the invention, there is provided a data multiplexing method for multiplexing data for a reproducing apparatus which performs multiple-path reproduction by inputting given ones of a plurality of multiplexed streams that are based on different time bases to a decoding apparatus while switching among the given multiplexed streams at a given timing, comprising the steps of detecting an end time when supply of elementary streams constituting a first given one of the plurality of multiplexed streams which precedes a second given one of the plurality of multiplexed streams to buffer memories of the decoding apparatus is finished; a first output time when a last access unit of all the elementary streams constituting the first given multiplexed stream is output from the buffer memories; a decoding cycle of access units; and a second output time when a first access unit of all the elementary streams constituting the second multiplexed stream is output from the buffer memories; and determining a multiplexing initial time of the second given multiplexed stream based on the end time, the first output time, the decoding cycle, and the second output time. With this data multiplexing method, a buffer memory failure can be prevented when a plurality of multiplexed streams are reproduced while being switched.

According to a fourth aspect of the invention, there is provided a recording medium for recording multiplexed data that has been formed by a data multiplexing method for multiplexing data for a reproducing apparatus which performs multiple-path reproduction by inputting given ones of a plurality of multiplexed streams that are based on different time bases to a decoding apparatus while switching among the given multiplexed streams at a given timing, wherein the recording medium records information for performing control so that supply of the data to a buffer memory of the decoding apparatus is made earlier in such a range that an overflow does not occur in the buffer memory. With this recording medium, a buffer memory failure can be prevented when a plurality of multiplexed streams are reproduced while being switched.

According to a fifth aspect of the invention, there is provided a recording medium for recording multiplexed data that has been formed by a data multiplexing method for multiplexing data for a reproducing apparatus which performs multiple-path reproduction by inputting given ones of a plurality of multiplexed streams that are based on different time bases to a decoding apparatus while switching among the given multiplexed streams at a given timing, wherein the recording medium records information for performing control so that a second given one of the plurality of multiplexed streams is supplied to respective memories of the decoding apparatus for storing a multiplexed stream such that capacities of the buffer memories are not exceeded, the capacities of the buffer memories being so set as to be able to store the second given multiplexed stream based on occupation amounts of the buffer memories which are detected in an end portion of a first given one of the plurality of multiplexed streams which precedes the second given multiplexed stream. With this recording medium, a buffer memory failure can be prevented when a plurality of multiplexed streams are reproduced while being switched.

According to a sixth aspect of the invention, there is provided a recording medium for recording multiplexed data that has been formed by a data multiplexing method for multiplexing data for a reproducing apparatus which performs multiple-path reproduction by inputting given ones of a plurality of multiplexed streams that are based on different time bases to a decoding apparatus while switching among the given multiplexed streams at a given timing, wherein the recording medium records a multiplexing initial time of the second given multiplexed stream which has been determined based on an end time when supply of elementary streams constituting a first given one of the plurality of multiplexed streams which precedes the second given multiplexed stream to buffer memories of the decoding apparatus is finished, a first output time when a last access unit of all the elementary streams constituting the first given multiplexed stream is output from the buffer memories, a decoding cycle of access units, and a second output time when a first access unit of all the elementary streams constituting the second multiplexed stream is output from the buffer memories. With this recording medium, a buffer memory failure can be prevented when a plurality of multiplexed streams are reproduced while being switched.

BRIEF DESCRIPTION OF THE DRAWINGS

FIG. 7 shows an example of configuration of a decoder of an E-STD model;

FIGS. 19A–19D show an example of how the preceding multiplexed streams are processed in the merging of the multiple-path reproduction; and FIG. 20 is a flowchart showing a multiplexing process of a multiplexed stream MBc.

DESCRIPTION OF THE PREFERRED EMBODIMENT

Figure 10:
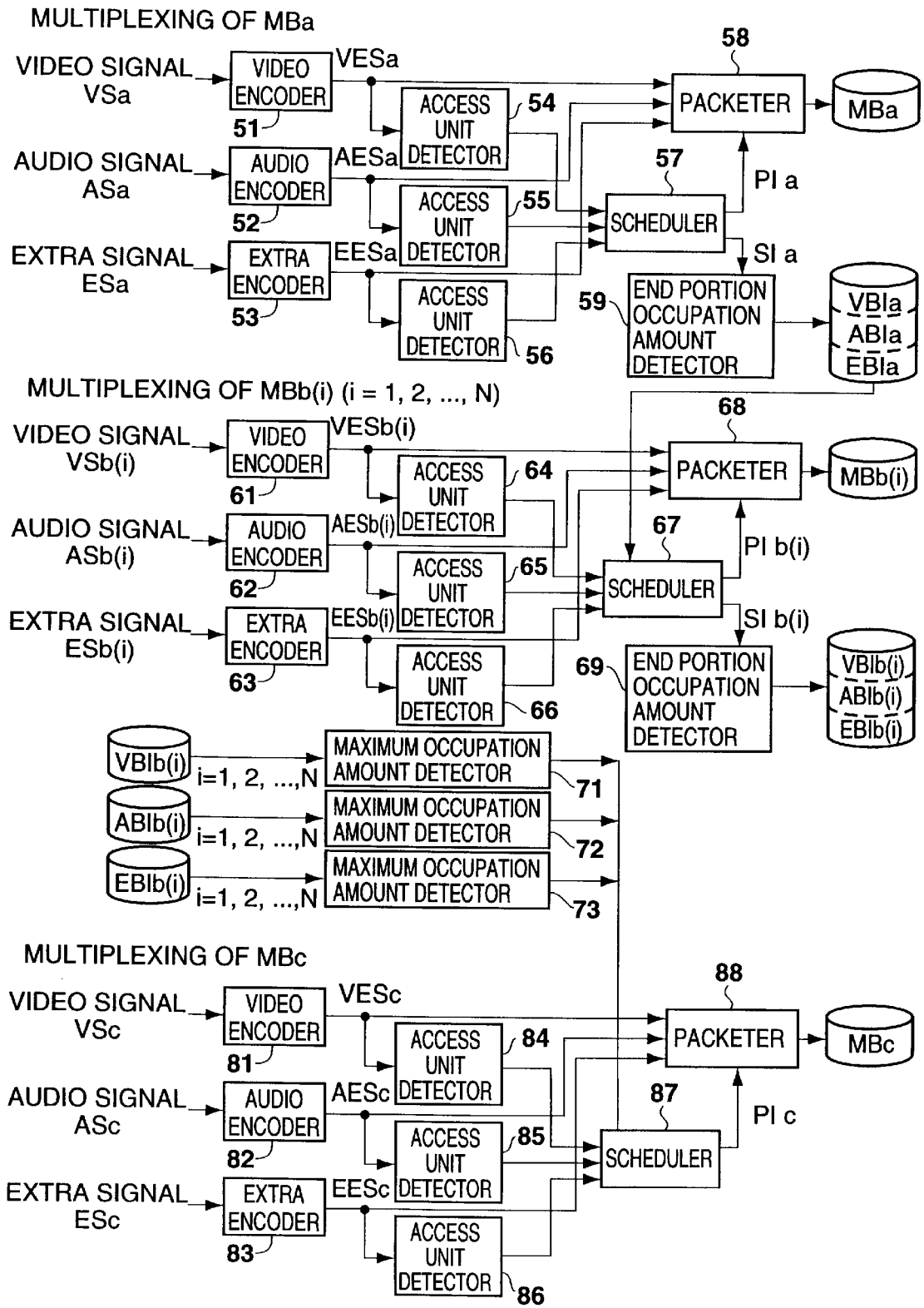
FIG. 10 is a block diagram showing an example of configuration of a coding apparatus to which the present invention is applied.
Figure 11:
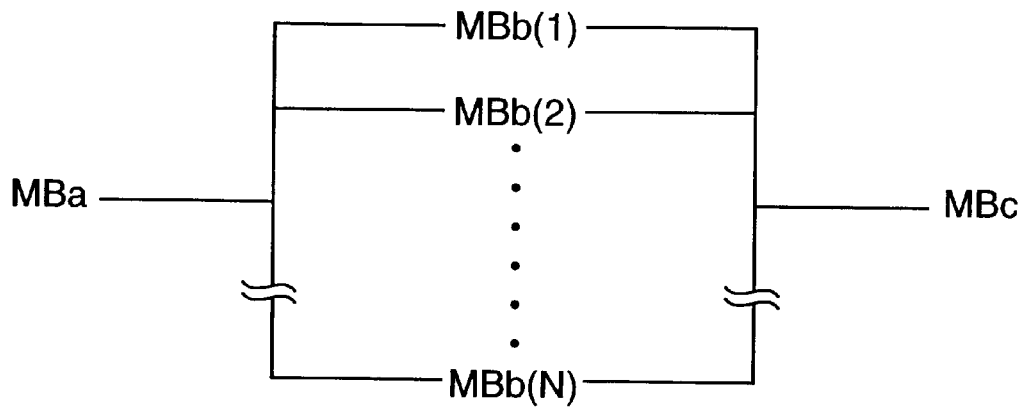
FIG. 11 shows an example of multiple-path reproduction.

FIG. 10 shows an example of configuration of a coding apparatus to which a data multiplexing method of the present invention is applied. This coding apparatus generates an application which enables formation of N reproduction paths where N is an arbitrary natural number. That is, as shown in FIG. 11, a desired reproduction path of formed by selecting one of N multiplexed streams MBb(i) (i=1, 2, . . . , N) which are located between multiplexed streams MBa and MBc. Each multiplexed stream consists of elementary streams obtained by encoding a video signal, an audio signal, and another signal (for instance, a caption signal).

A video encoder 51 of the coding apparatus encodes an input video signal VSa and outputs an elementary stream VESa. An audio encoder 52 encodes an input audio signal ASa and outputs an elementary stream AESa. An extra encoder 53 encodes an input extra signal ESa and outputs an elementary stream EESa.

An access unit detector 54 receives the elementary stream VESa and detects such information as a size, a decoding time, and a display time of each of its access units. An access unit detector 55 receives the elementary stream AESa and detects such information as a size, a decoding time, and a display (output) time of each of its access units. An access unit detector 56 receives the elementary stream EESa and detects such information as a size, a decoding time, and a display (output) time of each of its access units.

A scheduler 57 receives the information detected by the access detectors 54–56 and determines each packet length, a packet order, a SCR value, and values of other parameters based on the received information. The values thus determined are supplied to a packeter 58 as packeting information PIa. The scheduler 57 further outputs data supply information SIa which includes data of a temporal variation of the data supply amount, for instance.

The packeter 58 generates a multiplexed stream MBa by packeting and packing the elementary streams supplied from the video encoder 51, the audio encoder 52, and the extra encoder 53 based on the packeting information PIa supplied from the scheduler 57.

An end portion occupation amount detector 59 calculates end portion buffer occupation information VBIa, ABIa, and EBIa based on the data supply information SIa supplied from the scheduler 57.

A video encoder 61 encodes an input video signal VSb(i) and outputs an elementary stream VESb(i). An audio encoder 62 encodes an input audio signal ASb(i) and outputs an elementary stream AESb(i). An extra encoder 63 encodes an input extra signal ESb(i) and outputs an elementary stream EESb(i).

An access unit detector 64 receives the elementary stream VESb(i) and detects such information as a size, a decoding time, and a display time of each of its access units. An access unit detector 65 receives the elementary stream AESb(i) and detects such information as a size, a decoding time, and a display (output) time of each of its access units. An access unit detector 66 receives the elementary stream EESb(i) and detects such information as a size, a decoding time, and a display (output) time of each of its access units.

A scheduler 67 receives the information detected by the access detectors 64–66 and determines each packet length, a packet order, a SCR value, and values of other parameters based on the received information. The values thus determined are supplied to a packeter 68 as packeting information PIb(i). The scheduler 67 calculates a buffer quasi-capacity of a head portion of a multiplexed stream MBb(i) based on the end portion buffer occupation information VBIa, ABIa, and EBIa of the multiplexed stream MBa which information was output in its multiplexing. A multiplexed stream MBb(i) is formed by multiplexing by using the thus-calculated buffer quasi-capacity as the initial value. The scheduler 67 further outputs data supply information SIb(i) which includes data of a temporal variation of the data supply amount, for instance.

The packeter 68 generates a multiplexed stream MBb(i) by packeting and packing the elementary streams supplied from the video encoder 61, the audio encoder 62, and the extra encoder 63 based on the packeting information PIb(i) supplied from the scheduler 67.

An end portion occupation amount detector 69 calculates end portion buffer occupation information VBIb(i), ABIb(i), and EBIb(i) based on the data supply information SIb(i) supplied from the scheduler 67.

Before formation of a multiplexed stream MBc by multiplexing, maximum occupation amount detectors 71–73 detects maximum occupation amounts from among the N pieces of end portion buffer occupation amounts VBIb(i), ABIb(i), and EBIb(i) (i=1, 2, . . . , N; N is a natural number) that were calculated in the multiplexing of the multiplexed streams MBb(i), and supplies the maximum occupation amounts to a scheduler 87 as end portion buffer occupation information of the three kinds of elementary streams.

A video encoder 81 encodes an input video signal VSc and outputs an elementary stream VESc. An audio encoder 82 encodes an input audio signal ASc and outputs an elementary stream AESc. An extra encoder 83 encodes an input extra signal ESc and outputs an elementary stream EESc.

An access unit detector 84 receives the elementary stream VESc and detects such information as a size, a decoding time, and a display time of each of its access units. An access unit detector 85 receives the elementary stream AESc and detects such information as a size, a decoding time, and a display (output) time of each of its access units. An access unit detector 86 receives the elementary stream EESc and detects such information as a size, a decoding time, and a display (output) time of each of its access units.

A scheduler 87 calculates a head portion buffer quasi-capacity of a multiplexed stream MBc based on the end portion buffer occupation information supplied from the maximum occupation amount detectors 71–73. A multiplexed stream MBc is formed by multiplexing by using the thus-calculated head portion buffer quasi-capacity and the information supplied from the access unit detectors 84–86.

A packeter 88 generates a multiplexed stream MBc by packeting and packing the elementary streams supplied from the video encoder 81, the audio encoder 82, and the extra encoder 83 based on the packeting information PIc supplied from the scheduler 87.

Next, the operation of the coding apparatus will be described. First, the operation of forming a multiplexed stream MBa will be described. When a video signal VSa is input to the video encoder 51, it is encoded therein and an elementary stream VESa is output as coded data. When an audio signal VSa is input to the audio encoder 52, it is encoded therein and an elementary stream AESa is output. When an extra signal ESa is input to the extra encoder 53, it is encoded therein and an elementary stream EESa is output.

The elementary stream VESa is supplied to the access unit detector 54, which detects such information as a size, a decoding time, and a display time of each of its access units. The elementary stream AESa is supplied to the access unit detector 55, which detects such information as a size, a decoding time, and a display time of each of its access units. The elementary stream EESa is supplied to the access unit detector 56, which detects such information as a size, a decoding time, and a display time of each of its access units.

Figure 13:
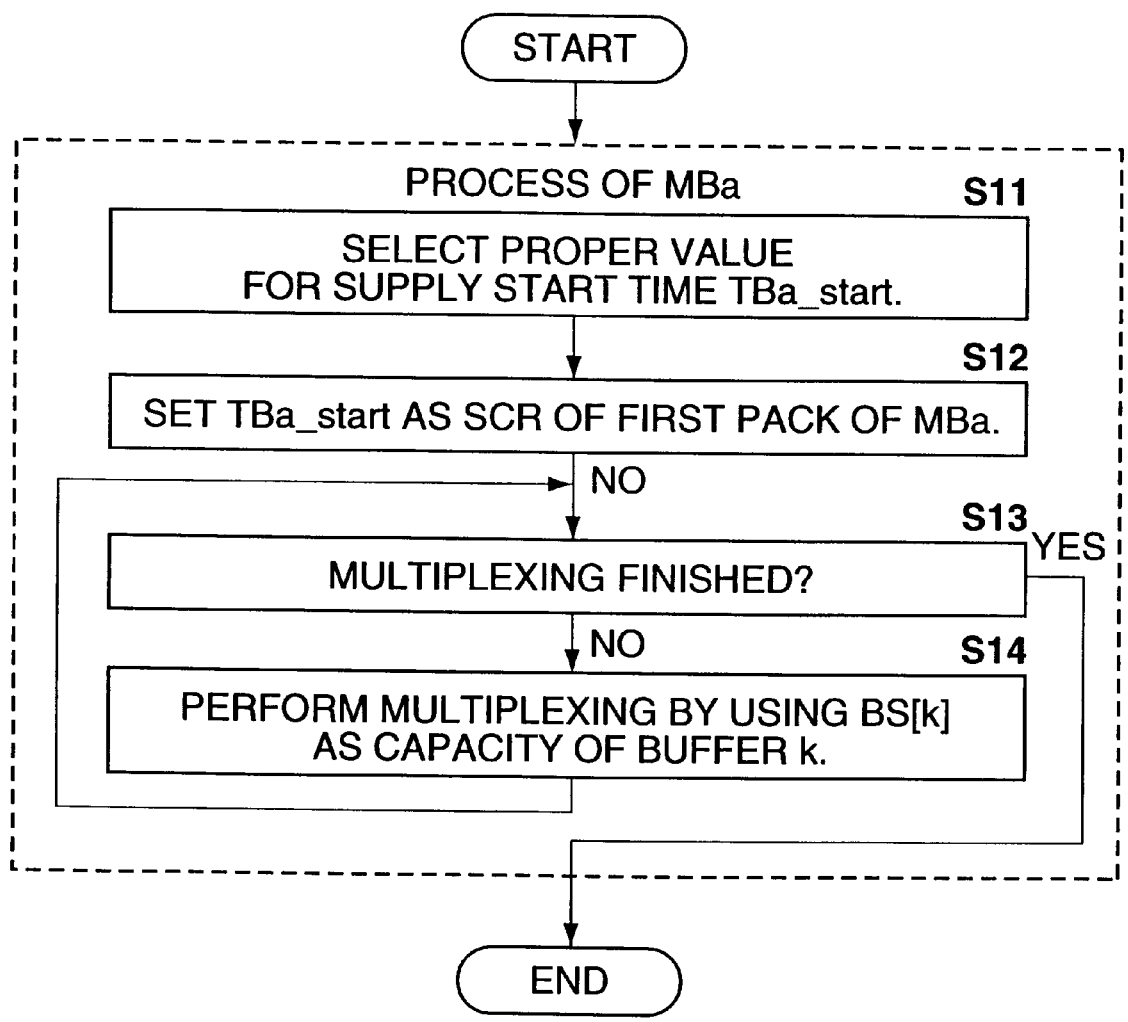
FIG. 13 is a flowchart showing a multiplexing process of a multiplexed stream MBa.

The information detected by the access unit detectors 54–56 is supplied to the scheduler 57. The scheduler 57 determines lengths of packets of video data, audio data, and the like, a pack length, a packet order, an SCR value, and values of other parameters. At this time, to avoid an underflow, in multiplexing of an end portion a proper measure is taken so that data is supplied to all the buffers as early as possible (described later). A detailed operation of the scheduler 57 will be described later with reference to flowcharts of FIGS. 13 and 15.

The elementary streams VESa, AESa, and EESa are supplied from the video encoder 51, the audio encoder 52, and the extra encoder 53 to the packeter 58. The packeter 58 generates a multiplexed stream MBa by packeting and packing the elementary streams VESa, AESa, and EESa based on packeting information supplied from the scheduler 57.

Based on the elementary streams VESa, AESa, and EESa, the scheduler 57 generates data supply information SIa, which is supplied to the end portion occupation amount detector 59. Based on the data supply information SIa, the end portion occupation amount detector 59 calculates, for each elementary stream, end portion buffer occupation information VBIa, ABIa, or EBIa which indicates a buffer occupation states of an end portion.

Next, the operation of generating multiplexed streams MBb will be described. As shown in FIG. 11, there are N multiplexed streams MBb(i) (i=1, 2, . . . , N). Since the process for forming each of the multiplexed streams MBb(i) is basically the same as that for forming the multiplexed stream MBa, no detailed description therefor is made here. The scheduler 67 calculates a head portion buffer quasi-capacity that is a buffer capacity of a head portion of the multiplexed stream MBb based on end portion buffer occupation information that was output in the multiplexing of the multiplexed stream MBb. The multiplexing is performed by using the head portion buffer quasi-capacity as the initial value.

Figure 18:
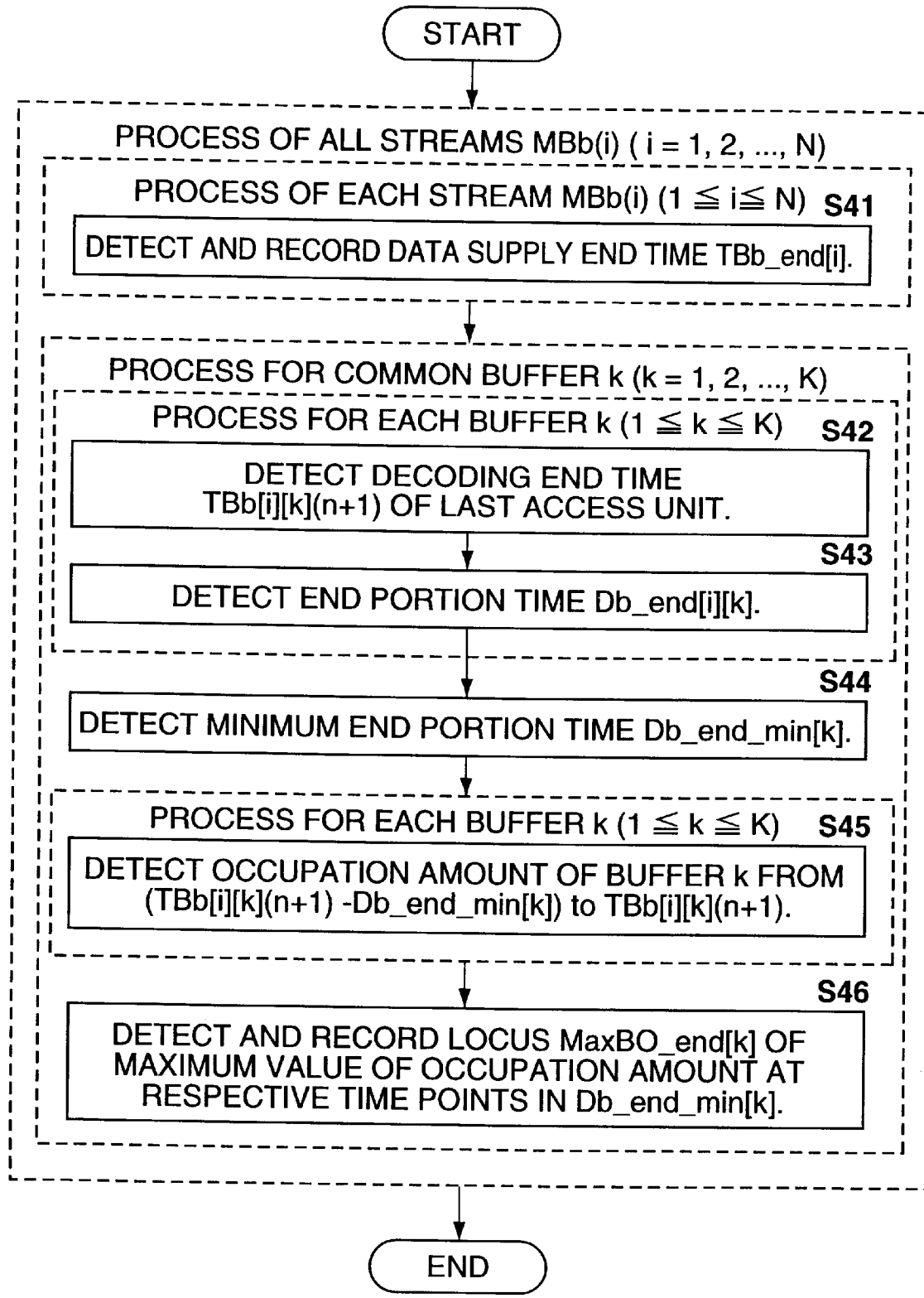
FIG. 18 is a flowchart showing a post-process of the multiplexed streams MBb(i)

At this time, the scheduler 67 calculates a multiplexing initial time from the end portion time of the multiplexed stream MBa, and employs it as a SCR value of the pack header of the first pack of the multiplexed stream MBb. A detailed operation of the scheduler 67 will be described later with reference to flowcharts of FIGS. 16 and 18.

Before generation of a multiplexed stream MBc, N pieces of end portion buffer occupation information VBIb(i), ABIb(i), and EBIb(i) (i=1, 2, . . . , N) are calculated from the multiplexing of the multiplexed streams MBb. Therefore, end portion buffer occupation information that is the maximum occupation amounts for three kinds of elementary streams are calculated by the maximum occupation amount detectors 71, 72, and 73.

Finally, the operation of generating a multiplexed stream MBc will be described. Since this operation is basically the same as the operation of generating the multiplexed stream MBa, no detailed description therefor is made here. The scheduler 87 calculates, for each elementary stream, a head portion buffer quasi-capacity of the corresponding buffer based on the end portion buffer occupation information. Multiplexing is performed by regarding the head portion buffer quasi-capacity as the capacity of each buffer. At this time, a multiplexing initial time is calculated from the end portion time of the multiplexed streams MBb, and employs it as a SCR value of the pack header of the first pack of the multiplexed stream MBc. A detailed operation of the scheduler 87 will be described later with reference to flowcharts of FIG. 20.

Figure 1:
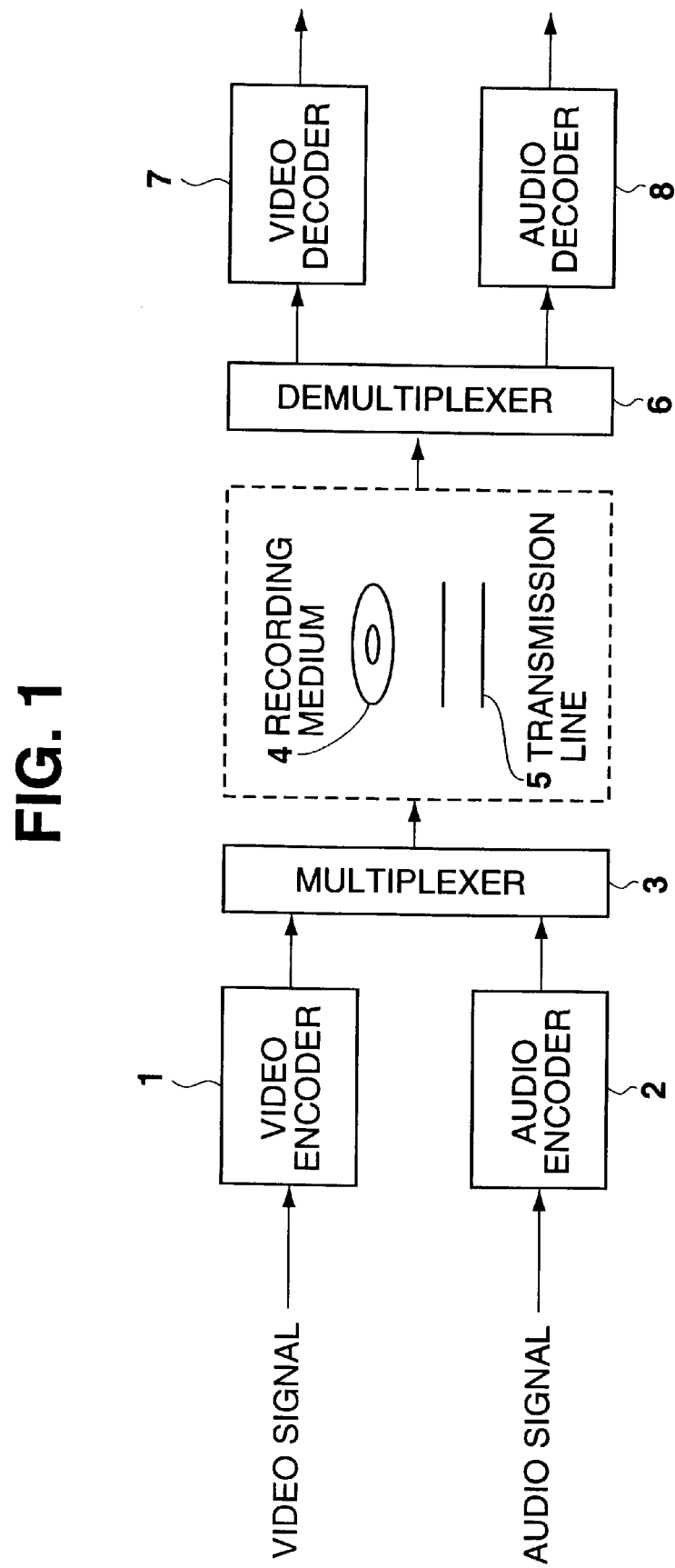
FIG. 1 is a block diagram showing an example of configuration of a conventional transmission/reception system.
Figure 2:
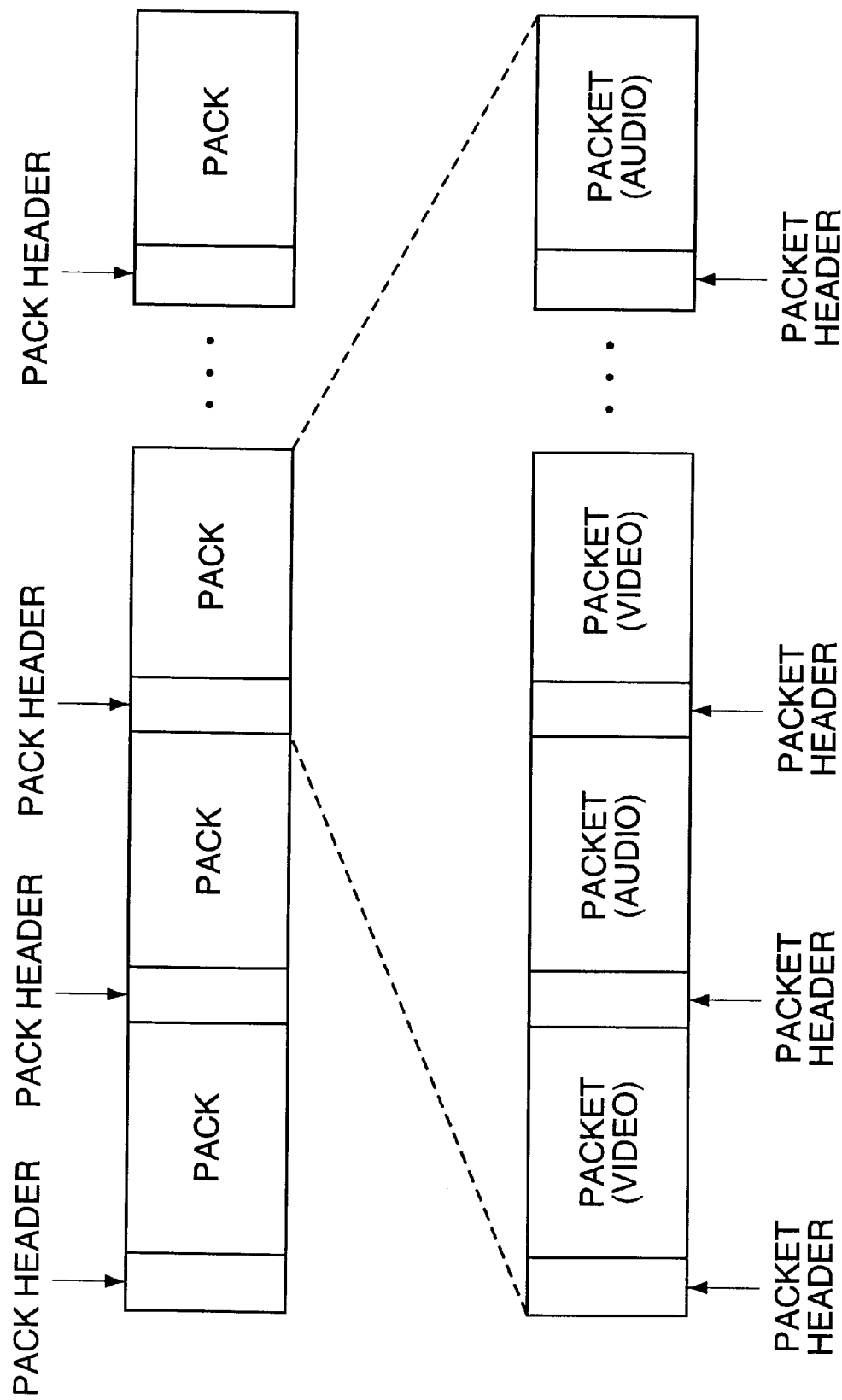
FIG. 2 shows the structure of an ISO/IEC 13818-1 program stream or an ISO/IEC 11172-1 system stream.
Figure 3:
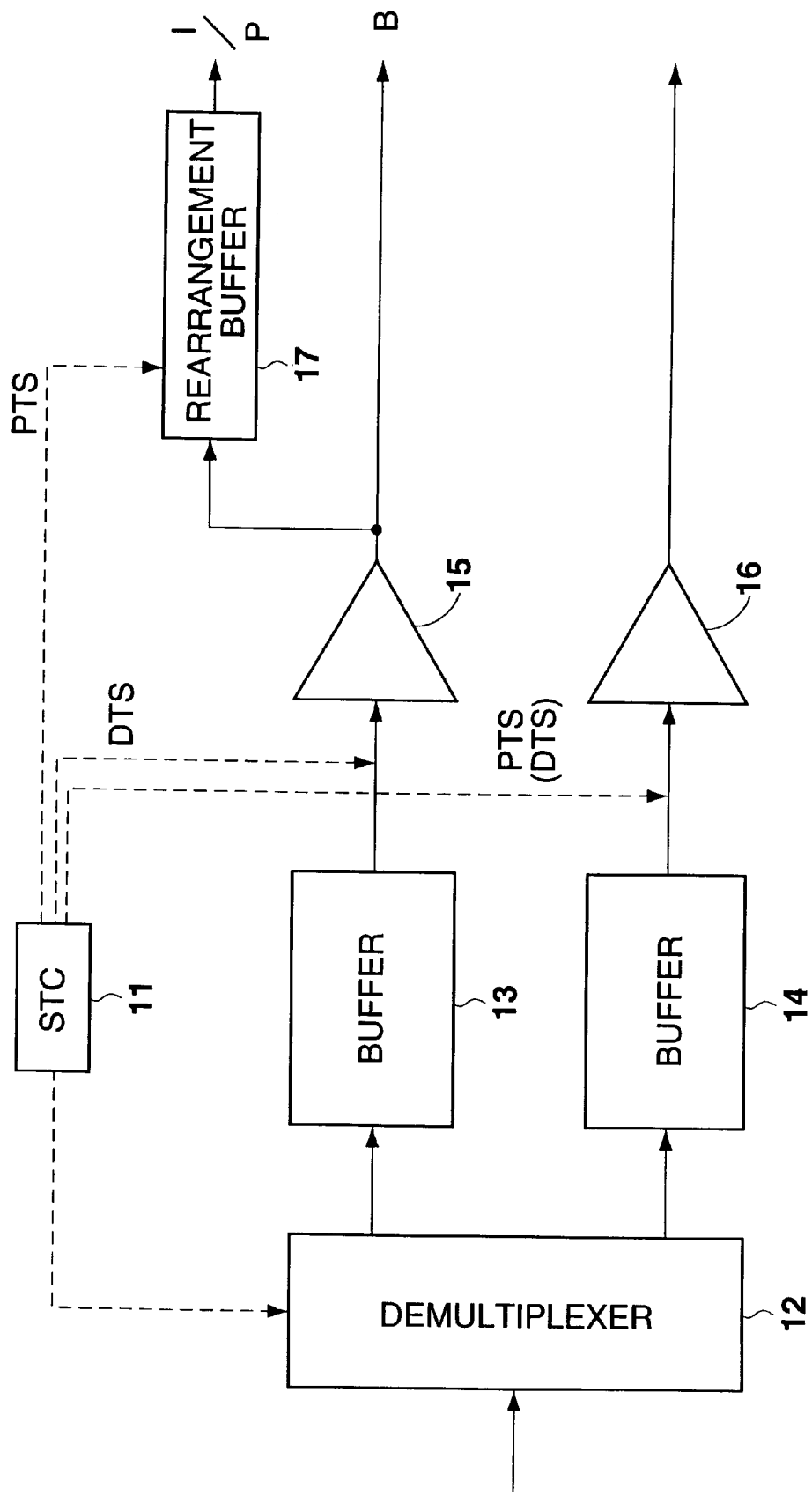
FIG. 3 shows a STD model of an ISO/IEC 13818-1 program stream or an ISO/IEC 11172-1 system stream.
Figure 4:
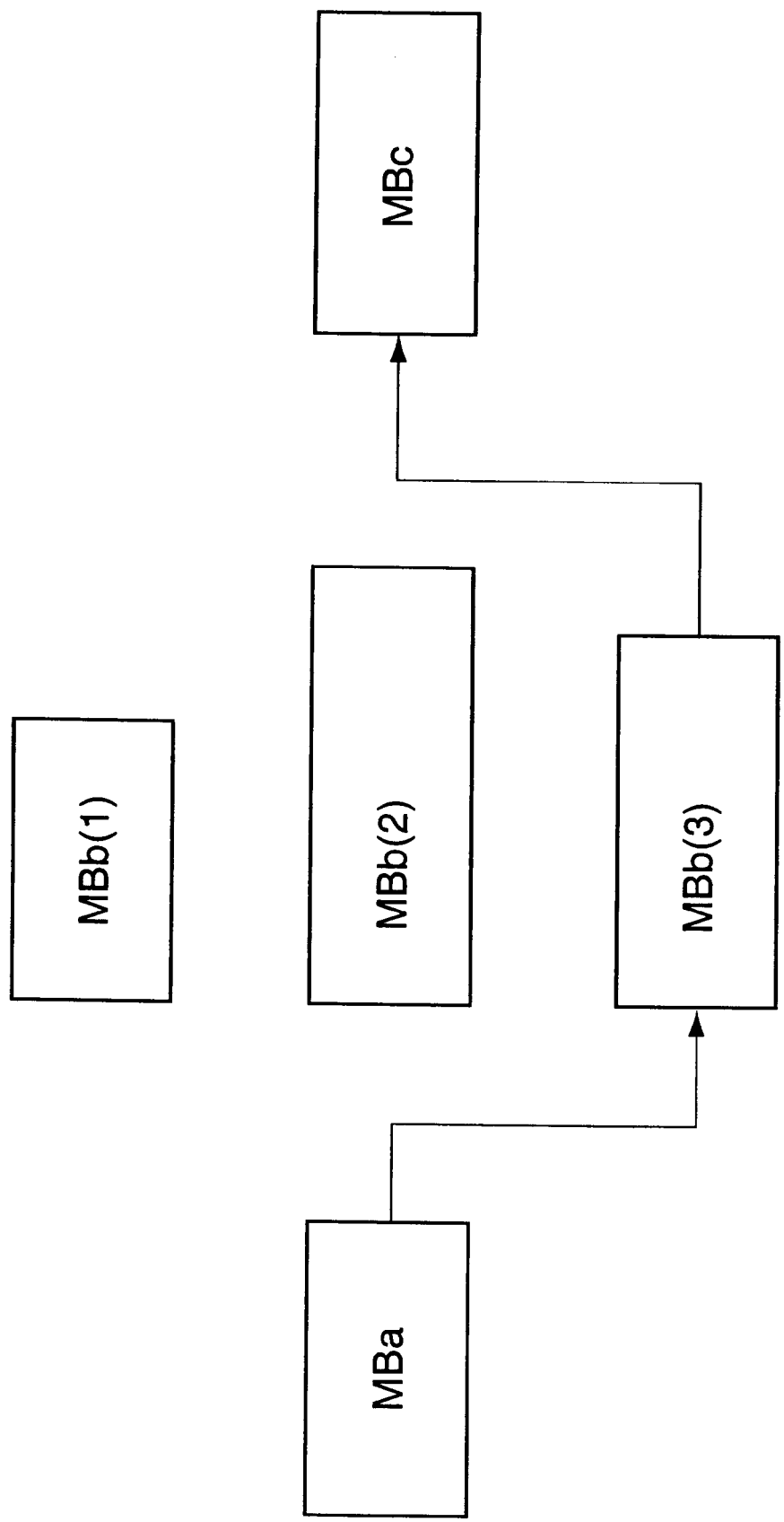
FIG. 4 shows the concept of multiple-path reproduction.
Figure 5:
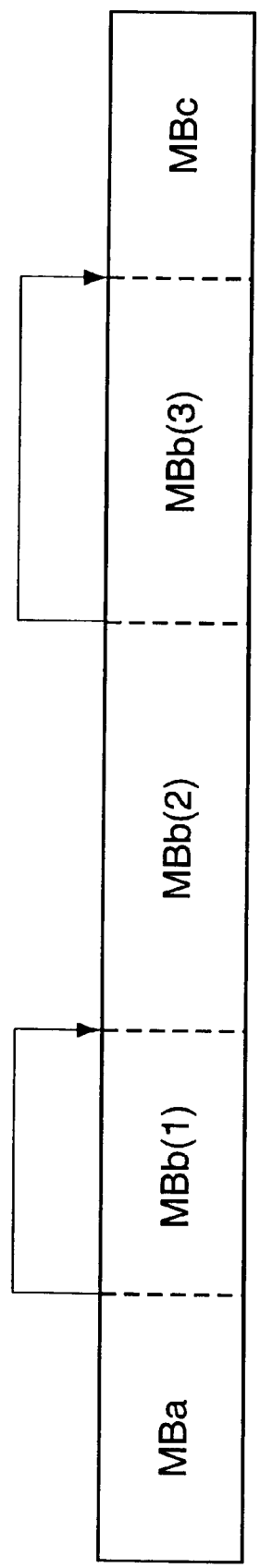
FIG. 5 illustrates input control of multiplexed streams in accordance with a selected reproduction path number.
Figure 6:
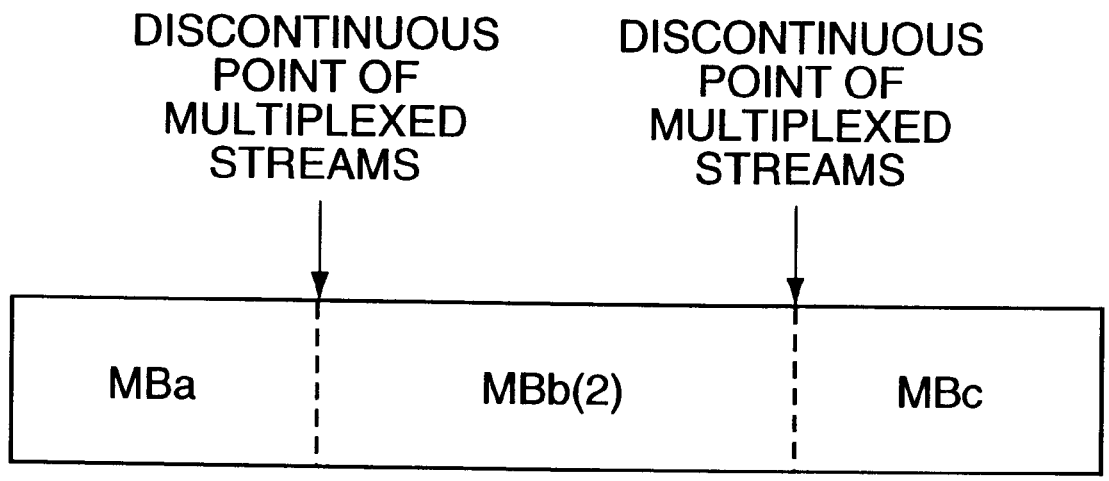
FIG. 6 shows an example of a plurality of multiplexed streams that are input to a decoding apparatus.
Figure 8A:
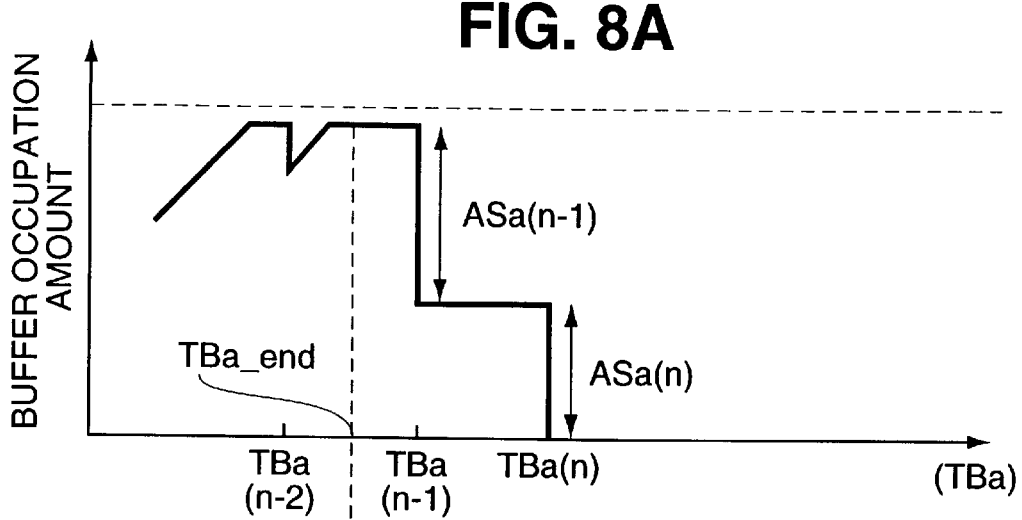
FIGS. 8A–8C show an example of a failure (overflow) in a buffer of the E-STD model at a discontinuous point of multiplexed streams.
Figure 8B:
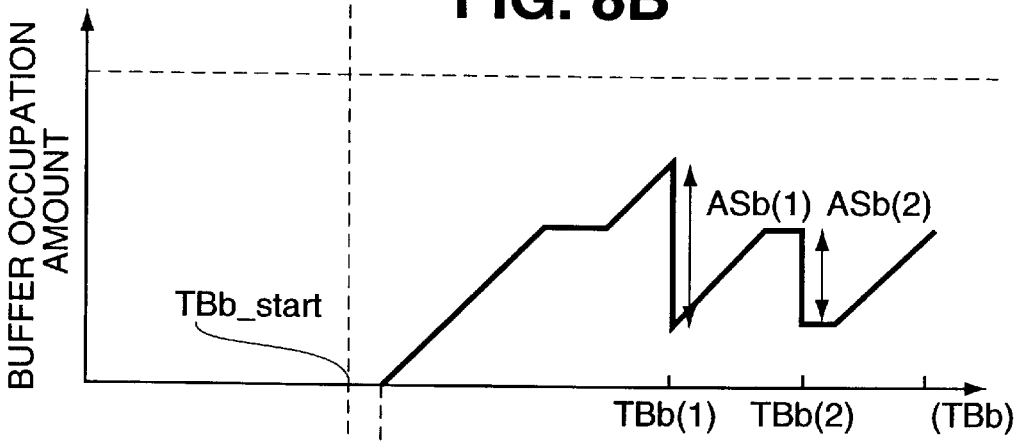
Figure 8C:
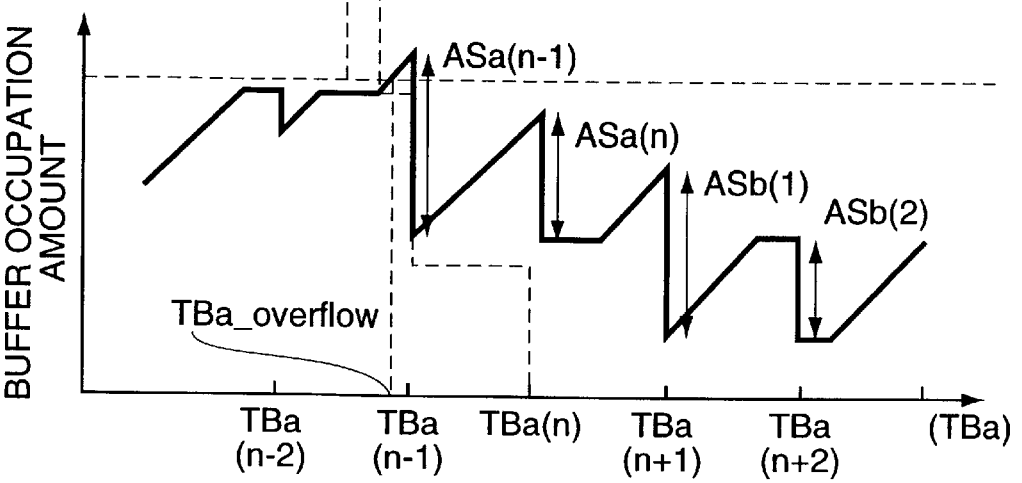
Figure 9A:
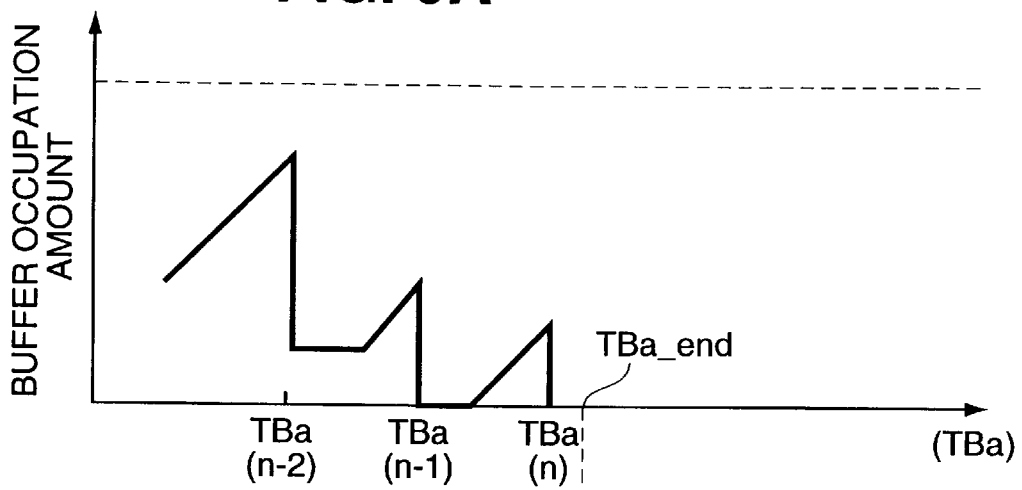
FIGS. 9A–9C show an example of a failure (underflow) in a buffer of the E-STD model at a discontinuous point of multiplexed streams.
Figure 9B:
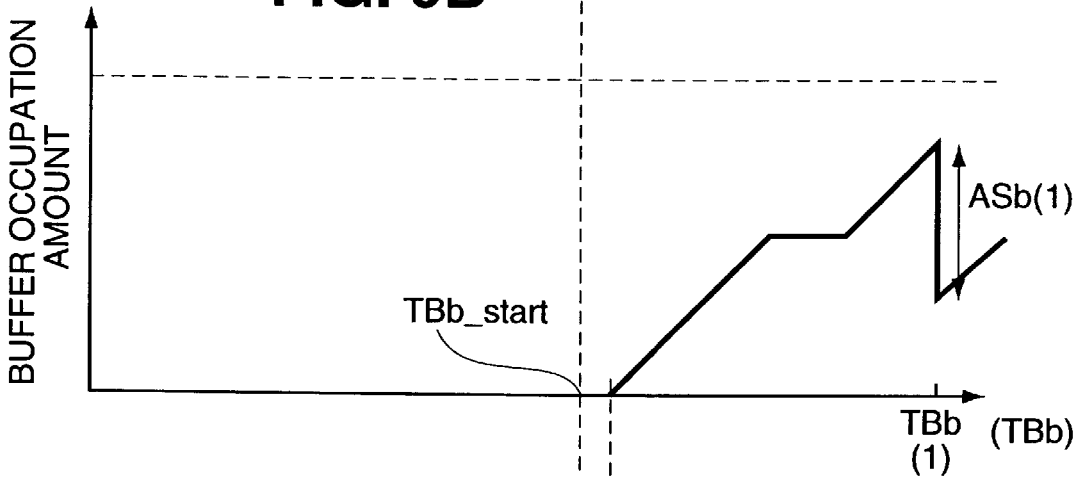
Figure 9C:
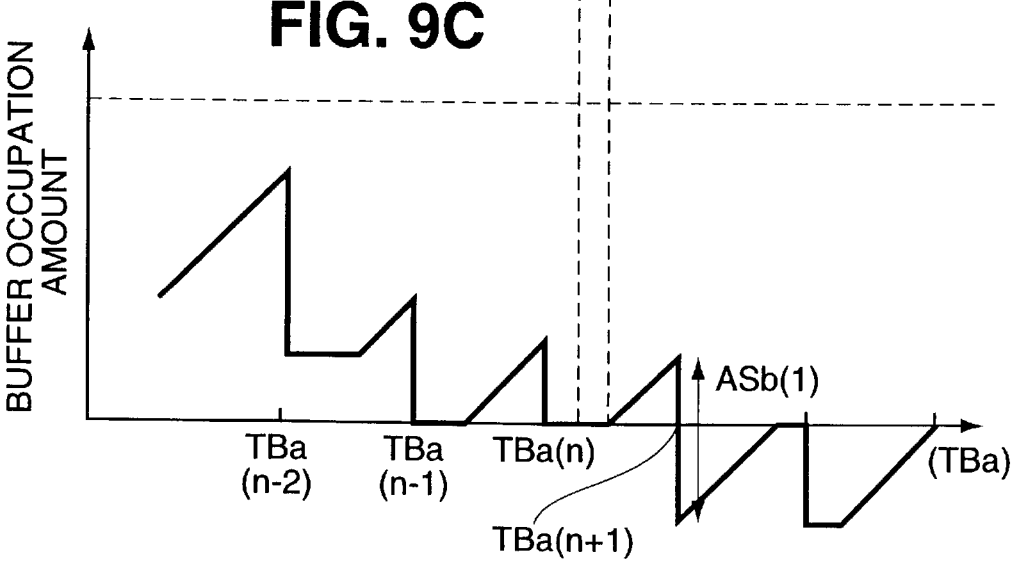

Next, a method for avoiding a buffer underflow will be described. To avoid the underflow as described above in connection with FIGS. 9A–9C, it is necessary that in all the buffers (buffers 25 and 26 shown in FIG. 7) of the E-STD model the time from the supply end time TBa_end of the multiplexed stream MBa to the output time TBa(n+1) of the access unit that is output next be longer than the time from the supply start time TBb_start of the multiplexed stream MBb to the output time TBb(1) of the first access unit.

That is, it is necessary to generate multiplexed streams before and after a discontinuous point so that a relationship of Formula (1) is satisfied in all the buffers of the E-STD model and for all the elementary streams:

$$TBa(n+1)-TBa\_end > TBb(1)-TBb\_start \qquad (1)$$

In Formula (1), if TBa(n+1) and TBb(1) are fixed values, the degree of freedom in determining time TBb_start is larger when the supply end time TBa_end of the preceding multiplexed stream MBa is earlier with respect to time TBa(n+1). That is, the degree of freedom in the multiplexing (data supply schedule) of the ensuing multiplexed stream MBb can be increased. Therefore, the following conditions are established for multiplexing of multiplexed streams before and after a discontinuous point:

(1) Multiplexing is performed so that data are supplied to all the buffers as early as possible in an end portion of an ensuing multiplexed stream.

(2) Time TBb_start is determined so that Formula (1) is satisfied in multiplexing of an ensuing multiplexed stream.

Next, a method for avoiding an overflow will be described. There are two kinds of discontinuous points in multiple-path reproduction: a "branching" point where switching is made from a single multiplexed stream to a plurality of multiplexed streams and a "merging" point where switching is made from a plurality of multiplexed streams to a single stream. Every application that performs multiple-path reproduction can be realized by combining these two kinds of discontinuous points. In view of this, a multiplexing method for avoiding a buffer overflow in the E-STD model will be described for each case of "branching" and "merging."

In the following, a description will be made of a multiplexing process of each multiplexed stream in the multiple-path reproduction shown in FIG. 11. As shown in FIG. 11, switching is made from the multiplexed stream MBa to the ensuing, plurality of multiplexed streams MBb(i) (i=1, 2, . . . , N), and then the switching is made to the multiplexed stream MBc.

Referring to a flowchart of FIG. 12, a description will be made of a case of performing N-path reproduction. First, at step S1, a multiplexing process of the multiplexed stream MBa is executed. Details of this process will be described with reference to a flowchart of FIG. 13.

First, at step S11, a proper value is selected for the supply start time TBa_start, i.e., the time when data supply is started. At step S12, the selected supply start time TBa_start is set as a SCR value of the first pack of the multiplexed stream MBa. At step S13, it is judged whether the multiplexing process has finished. If the multiplexing process has not finished yet, the process goes to step S14, where multiplexing is performed by using a buffer capacity [k] as the capacity of a buffer k, where k is an arbitrary natural number that does not exceed the number K of buffers. Thereafter, the process returns to steps S13 to again execute steps S13 and S14.

On the other hand, if it is judged at step S13 that the multiplexing process has finished, the process concerned is terminated.

Then, at step S2 (see FIG. 12), a post-process of the multiplexed stream MBa is performed. At step S3, a multiplexing process of the ensuing multiplexed streams MBb are performed. In this case, a process based on a multiplexing method for "branching" is performed. As described above, the "branching" means switching from a single, preceding multiplexed stream (MBa) to a plurality of ensuing multiplexed streams (MBb(i), i=1, 2, . . . , N). Since the following multiplexing method is common to all of the ensuing multiplexed streams, an ensuing multiplexed stream(s) is denoted simply by MBb where appropriate.

Figure 14A:
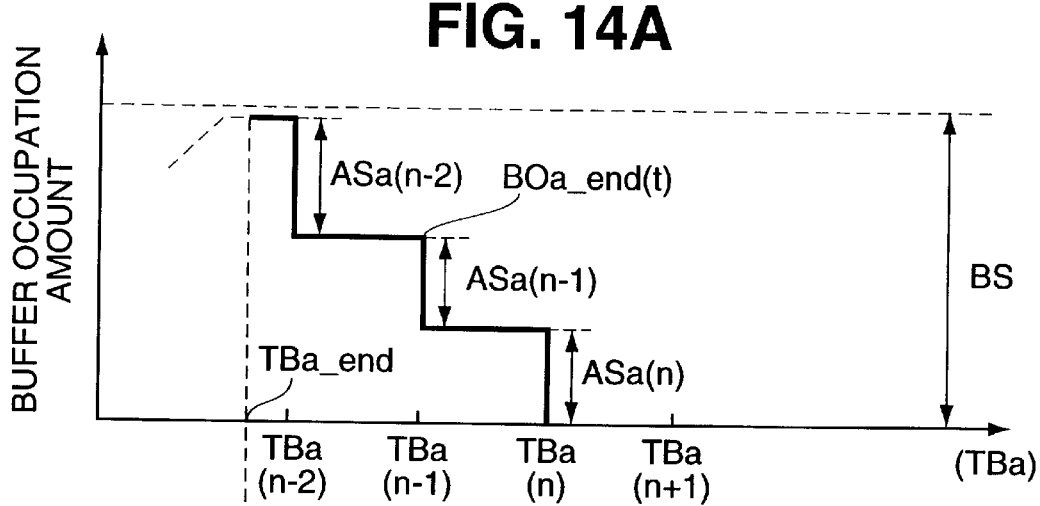
FIGS. 14A–14C show multiplexing for branching in the multiple-path reproduction.
Figure 14B:
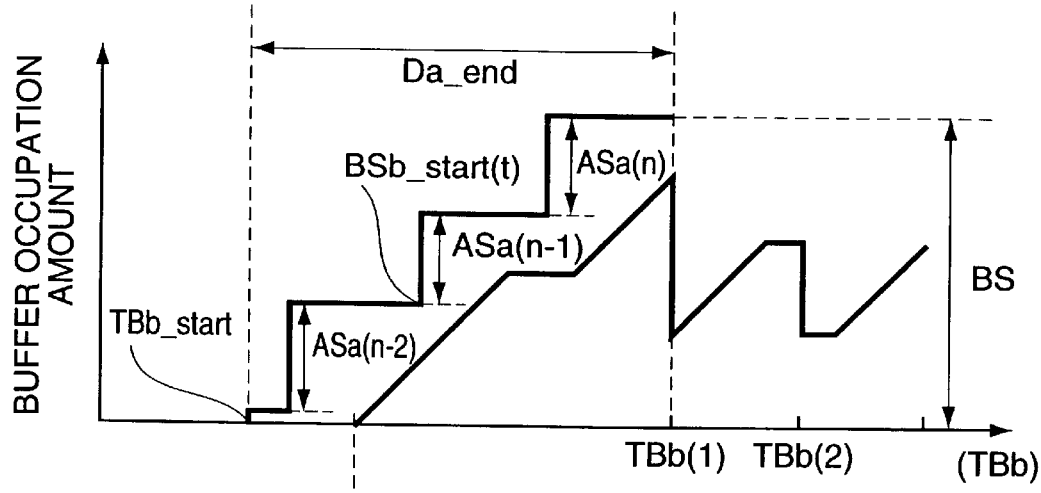
Figure 14C:
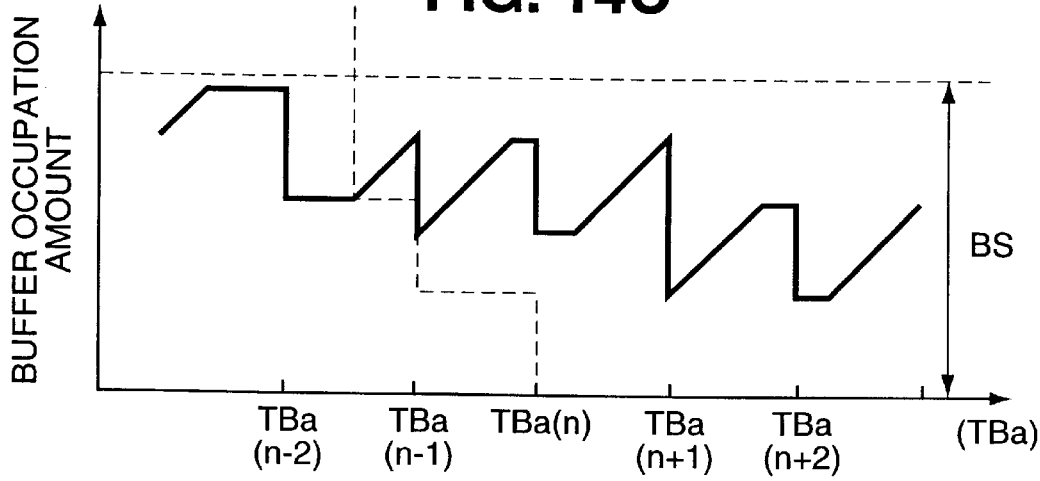

FIGS. 14A–14C show variations of buffer occupation amounts of the multiplexed streams MBa and MBb in the same buffer of the E-STD model. Therefore, in this description the variable k that identifies a buffer is omitted where appropriate. In each of FIGS. 14A–14C, the vertical axis represents the buffer occupation amount and the horizontal axis represents the time. It is assumed that the preceding multiplexed stream MBa has already been generated based on the time base TBa. That is, FIG. 14A shows how the buffer occupation amount varies according to the time base TBa after the data of the multiplexed stream MBa has been supplied thereto. In FIG. 14A, time TBa_end means a supply end time when all the data of the multiplexed stream MBa is finished.

Figure 15:
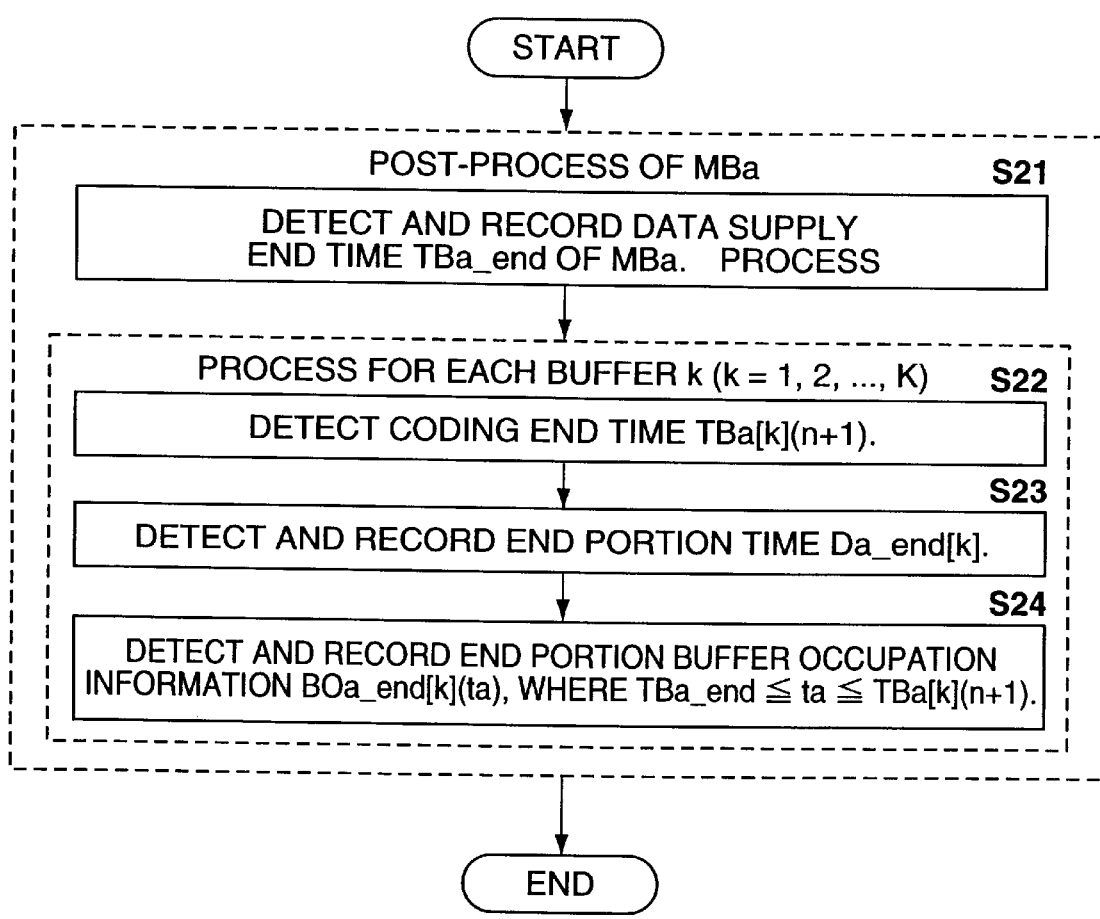
FIG. 15 is a flowchart showing a post-process of the multiplexed stream MBa.

In the following, the post-process of the multiplexed stream MBa will be described with reference to a flowchart of FIG. 15. First, at step S21, a data supply end time TBa_end of the multiplexed stream MBa is detected and recorded. At step S22, a decoding end time TBa[k](n+1) of the last access unit is detected. The decoding end time TBa[k](n+1) is an output time of the last access unit plus its decoding cycle.

Then, at step S23, an end portion time Da_end[k] is detected which is a period from time TBa_end to time TBa[k](n+1), i.e., TBa[k](n+1)−TBa_end. At step S24, end portion buffer occupation information BOa_end[k](ta) is detected and recorded which is the occupation amount of a buffer k at each time ta within the period Da_end[k], where TBa_end≦ta≦TBa[k](n+1).

The above steps are executed for every elementary stream of the multiplexed stream MBa.

Figure 16:
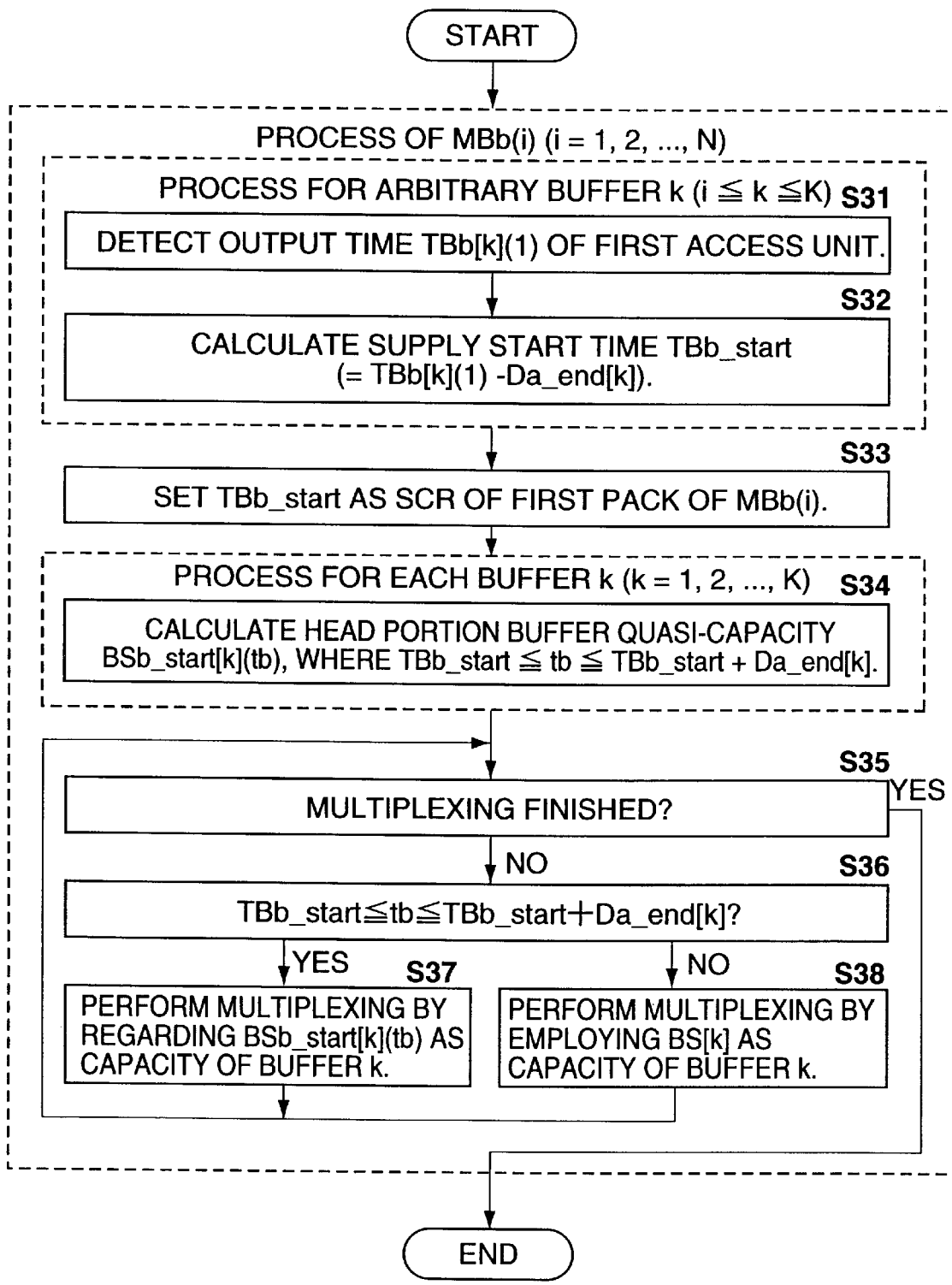
FIG. 16 is a flowchart showing a multiplexing process of multiplexed streams MBb(i)

Next, referring to a flowchart of FIG. 16, a description will be made of a process of forming the multiplexed streams MBb by multiplexing which follow the multiplexed stream MBa. It is assumed that the multiplexed streams MBb are generated based on the time base TBb.

In a process for an arbitrary buffer k, first, at step S31, an output time TBb[k](1) of the first access unit is detected. At step S32, a supply start time TBb_start of the multiplexed stream MBb is calculated. The supply start time TBb_start is common to every elementary stream and equal to time TBb[k](1) minus time Da_end[k].

At step S33, a supply start time TBb_start is set as a SCR value of the first pack of the multiplexed stream MBb(i). Time TBb_start should satisfy Formula (1). Steps S31 to S33 are executed for an arbitrary elementary stream.

Then, in a process for each buffer k, a head portion buffer quasi-capacity BSb_start[k](tb) is calculated at each time from time TBb_start to time Da_end. The head portion buffer quasi-capacity BSb_start[k](tb) is buffer capacity BS[k] minus BOa_end[k](ta). It is assumed that TBb_start≦tb≦TBb_start+Da_end[k], that is, TBb_start≦tb≦TBb(1).

That is, the following relationship is established:

$$BSb\_start[k](tb)=BS[k]-BOa\_end[k](ta)$$

where time tb, which is a sample value of the time base TBb, satisfies $$ta=tb-TBb\_start+TBa\_end.$$

As described above, BSb_start[k](tb) is called the head portion buffer quasi-capacity of the elementary stream concerned.

Then, at step S35, it is judged whether the multiplexing process has finished. If it is judged that the multiplexing process has not finished, the process goes to step S36, where it is judged whether the relationship TBb_start≦tb≦TBb_start+Da_end[k] is satisfied. If it is judged that this relationship is satisfied, the process goes to step S37, where multiplexing is performed so as not to cause any failure in each buffer by regarding the head portion buffer quasi-capacity BSb_start[k](tb) of each elementary stream which was calculated at step S34 as the capacity of the buffer k in a period from time TBb_start to time TBb_start+Da_end[k].

FIG. 14B shows an example of such multiplexing. ASa(n−2), ASa(n−1), and ASa(n) denote access units that are output at times TBa(n−2), TBa(n−1), and TBa(n), respectively, and associated arrows indicate their data amounts. The multiplexed stream MBb is formed by multiplexing such that the buffer occupation amount by data to be multiplexed does not exceed the head portion buffer quasi-capacity BSb_start(tb).

Then, the process returns to step S35 to again execute step S35 onward.

On the other hand, if it is judged that the relationship TBb_start≦tb≦TBb_start+Da_end[k] is not satisfied, the process goes to step S38, where multiplexing is performed by employing BS[k] as the capacity of the buffer k. Then, the process returns to step S35 to again execute step S35 onward.

If it is judged at step S35 that the multiplexing process has finished, the multiplexing process of the multiplexed stream MBb(i) is terminated.

FIG. 14C shows how the buffer occupation amount of the same buffer varies according to the time base TBa when the multiplexed streams MBa and MBb are continuously reproduced. No overflow occurs in any buffer because in the multiplexing of the multiplexed stream MBb the buffer occupation amount of an end portion of the multiplexed stream MBa is considered as described above.

Then, the process goes to step S4 (see FIG. 12), where a post-process of the multiplexed stream MBb(i) is performed. This process will be described below with reference to FIGS. 17A–17C and 18.

In this process, which is based on a multiplexing method for "merging," switching is made from the N preceding multiplexed streams (MBb(i), i=1, 2, . . . , N) to the single, ensuing multiplexed stream (MBc).

Figure 17A:
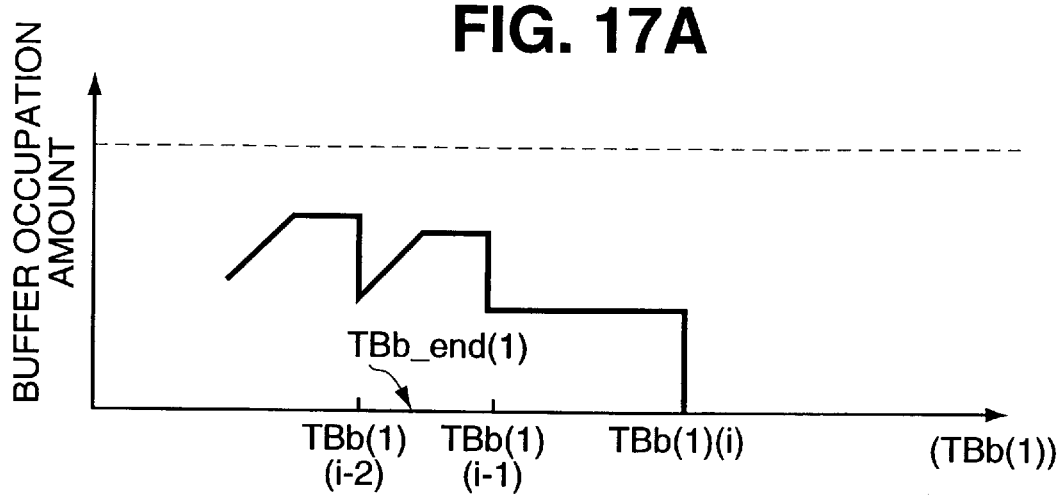
FIGS. 17A–17C show an example of preceding multiplexed streams in merging of the multiple-path reproduction.
Figure 17B:
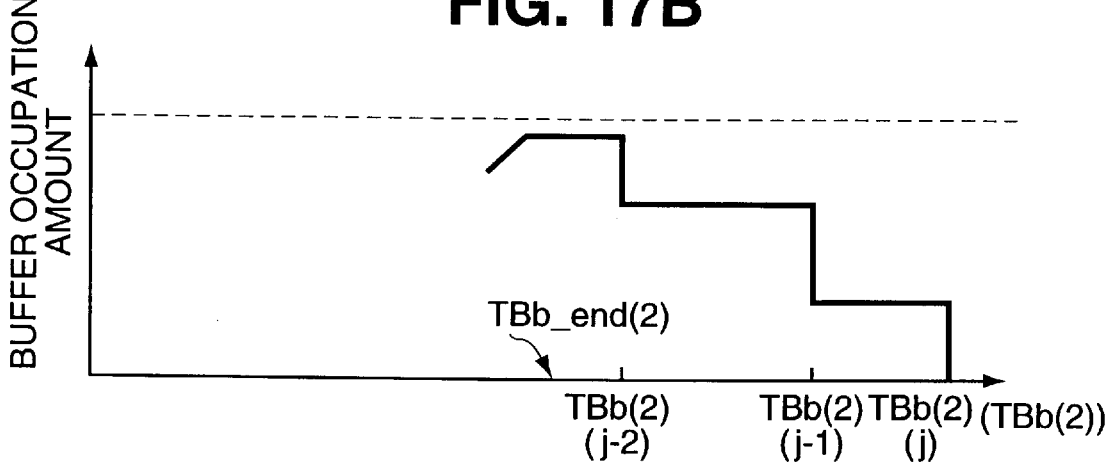
Figure 17C:
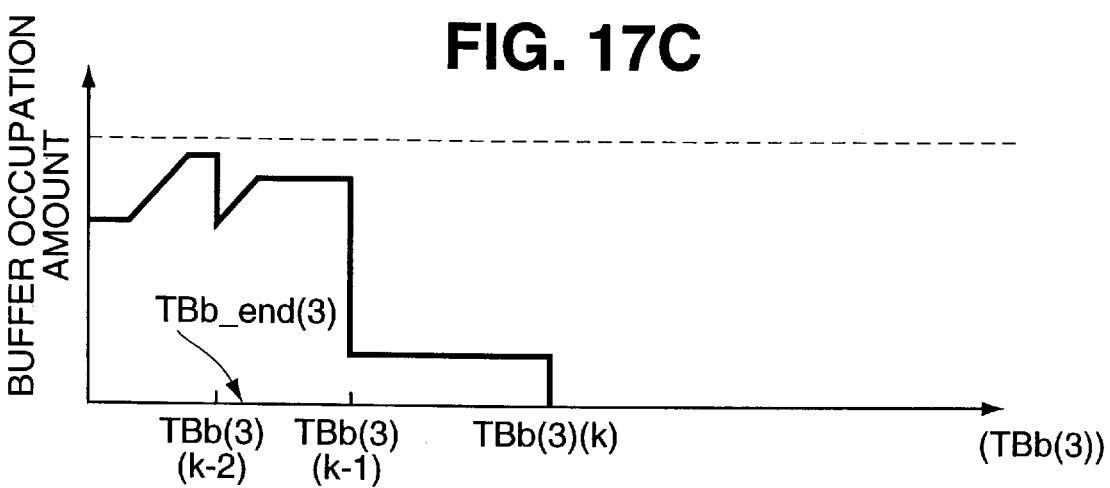

To secure generality, it is assumed that time lengths of the preceding multiplexed streams are different from each other. FIGS. 17A–17C show examples of preceding multiplexed streams in merging of multiple-path reproduction. To simplify the description, in this example the number of multiplexed streams MBb (see FIG. 11) is assumed to be three. In each of FIGS. 17A–17C, the vertical axis represents the buffer occupation amount and the horizontal axis represents the time.

First, at step S41 (see FIG. 18), as a process of each multiplexed stream MBb(i) (1≦i≦N), a data supply end time TBb_end[i] is detected and recorded.

Then, at step S42, decoding end times TBb[i][k](n+1) of the last access units are detected. At step S43, end portion times Db_end[i][k] are detected. In FIGS. 19A–19D, they are indicated as Db_end(1), Db_end(2), and Db_end(3).

Steps S42 and S43 are executed for each buffer k where 1≦k≦K.

Then, at step S44, the minimum end portion time Db_end_min[k] is detected from among the end portion times Db_end[i][k]. At step S45, times are calculated which are the decoding end times of the last access units minus the minimum end portion time Db_end min[k]. In FIGS. 19A–19D, they are TBb(1)(i+1)−Db_end(1), TBb(2)(j+1)−Db_end(1), and TBb(3)(k+1)−Db_end(1), where Db_end(1)<Db_end(3)<Db_end(2). The occupation amount of the buffer k is calculated at each time point from the above-calculated time to the decoding end time of the last access unit. This above process is performed for each buffer k where $1 \leq k \leq K$.

Then, at step S46, a locus MaxBO_end[k] of the maximum value of the buffer occupation amount at respective time points in the minimum end portion time Db_end_min [k] is detected and recorded. FIG. 19D shows the locus MaxBO_end[k] of the buffer occupation amount.

Figure 12:
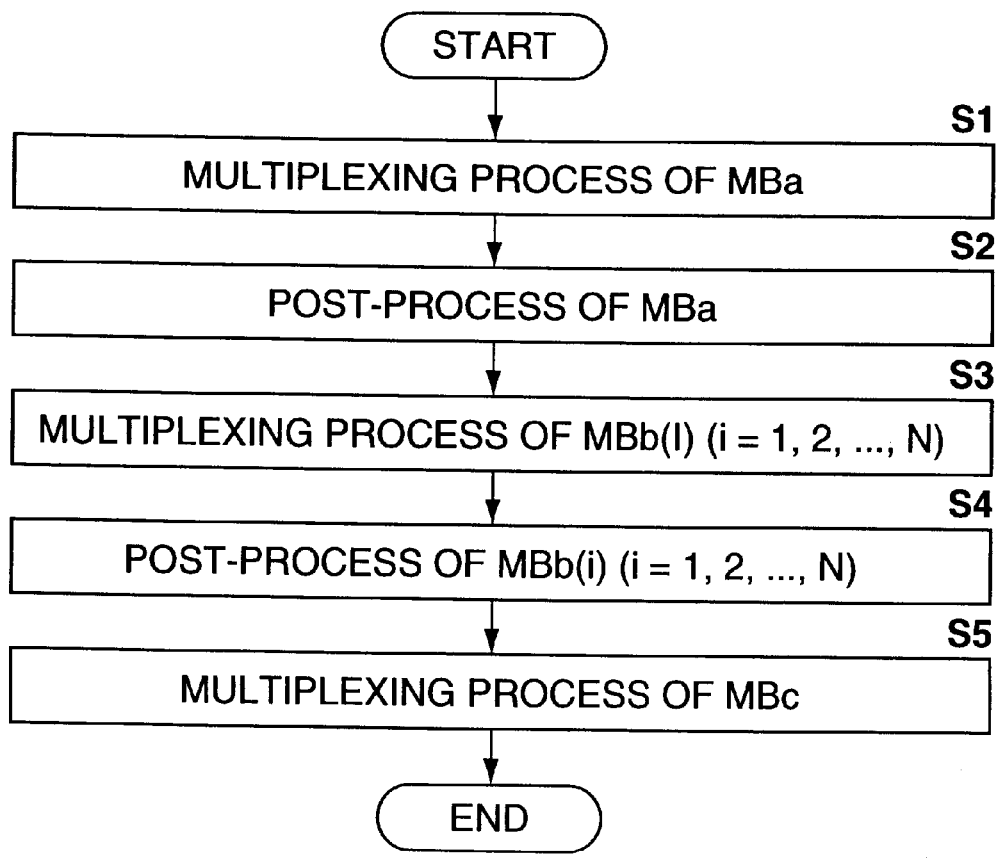
FIG. 12 is a flowchart showing a multiplexing process of multiplexed streams in the multiple-path reproduction of FIG. 11.

Then, the process goes to step S5 (see FIG. 12). At step S5, as described below with reference to a flowchart of FIG. 20, the ensuing multiplexed stream MBc is formed by multiplexing in basically the same manner as in the above-described case (see the flowchart of FIG. 16) by employing the time Db_end[i][k] calculated at step S43 (see FIG. 18) as an end portion time and regarding the locus MaxBO_end[k] determined at step S46 as maximum values of the buffer occupation amount in an end portion.

In the following, a process of forming the ensuing multiplexed stream MBc by multiplexing will be described with reference to FIG. 20.

In a process for an arbitrary buffer k, first, at step S51, an output time TBc[k](1) of the first access unit is detected. At step S52, a supply start time TBc_start of the multiplexed stream MBc is calculated. The supply start time TBc_start, which is the same for every elementary stream, is time TBc[k](1) minus the minimum end portion time Db_end_min[k] that was detected at step S44 (see FIG. 18).

At step S53, the supply start time TBc_start is set as a SCR value of the first pack of the multiplexed stream MBc. Steps S51 to S53 are executed for an arbitrary elementary stream.

Then, as a process for each buffer k, a head portion buffer quasi-capacity BSc_start[k](tc), which is a buffer capacity BS[k] minus MaxBO_end(tc) that was determined at step S46 (see FIG. 18), is calculated at respective time points from time TBc_start to time Db_end_min[k], where $TBc\_start \leq tc \leq TBc\_start+Db\_end\_min[k]$.

Then, at step S55, it is judged whether the multiplexing process has finished. If it is judged that the multiplexing process has not finished, the process goes to step S56, where it is judged whether the relationship $TBc\_start \leq tc \leq TBc\_start+Da\_end\_min[k]$ is satisfied. If it is judged that this relationship is satisfied, the process goes to step S57, where multiplexing is performed so as not to cause any failure in each buffer by regarding the head portion buffer quasi-capacity BSc_start[k](tc) of each elementary stream which was calculated at step S54 as the capacity of the buffer k in a period from time TBc_start to time TBc_start+Da_end_min[k].

Then, the process returns to step S55 to again execute step S55 onward.

On the other hand, if it is judged that the relationship $TBc\_start \leq tc \leq TBc\_start+Da\_end\_min[k]$ is not satisfied, the process goes to step S58, where multiplexing is performed by employing BS[k] as the capacity of the buffer k. Then, the process returns to step S55 to again execute step S55 onward.

If it is judged at step S55 that the multiplexing process has finished, the multiplexing process of the multiplexed stream MBc is terminated.

For example, the plurality of multiplexed streams that have been formed by multiplexing in the above manner are recorded on respective portions of the recording medium 4 such as a recordable DVD (digital versatile disc). Alternatively, they may be transmitted on the transmission path 5 after being combined into a single transport stream.

Although the above embodiment is directed to the case where the invention is applied to an MPEG1 system stream and an MPEG2 program stream which are mainly intended for a recording purpose, the invention can also be applied to an MPEG2 transport stream which are mainly used for a transmission purpose.

In the case of a transport stream, a single transport stream consist of a plurality of channels each corresponding to a single, independent stream. Each channel is generated based on an independent time base. Therefore, if the above method for a plurality of program streams is applied, as it is, to respective channels to thereby constitute a single transport stream, the channels can be multiplexed without causing any buffer failure in the decoding apparatus at the time of switching among the plurality of channels.

Although in the above embodiment a recordable digital versatile disc (DVD) is used as the recording medium, other recording media such as an optical disc, a mini disc (MD; trademark), a magneto-optical disc, and a magnetic tape may be used.

Further, the above embodiment can be used in systems in which a video signal and an audio signal are transmitted from a transmission side on a transmission line, received by a reception side, and corresponding video and audio information is displayed or output on the reception side, such as a TV conference system, a TV telephone system, and broadcasting equipment.

What is claimed is:

1. A data multiplexing method for multiplexing data for a reproducing apparatus which performs multiple-path reproduction by inputting given ones of a plurality of multiplexed streams that are based on different time bases to a decoding apparatus while switching among the given multiplexed streams at a given timing, comprising the steps of:

detecting occupation amounts of buffer memories of the decoding apparatus for storing a multiplexed stream in an end portion of a first given one of the plurality of multiplexed streams which precedes a second given one of the plurality of multiplexed streams;

imaginarily setting capacities of the buffer memories which can store the second given multiplexed stream based on the detected occupation amounts; and performing control so that the second given multiplexed stream is supplied to the respective memories such that the imaginarily set capacities of the buffer memories are not exceeded.

2. A data multiplexing method for multiplexing data for a reproducing apparatus which performs multiple-path reproduction by inputting given ones of a plurality of multiplexed streams that are based on different time bases to a decoding apparatus while switching among the given multiplexed streams at a given timing, comprising the steps of:

detecting (a) an end time when supply of elementary streams constituting a first given one of the plurality of multiplexed streams which precedes a second given one of the plurality of multiplexed streams to buffer memories of the decoding apparatus is finished;

(b) a first output time when a last access unit of all the elementary streams constituting the first given multiplexed stream is output from the buffer memories;

(c) a decoding cycle of access units; and (d) a second output time when a first access unit of all the elementary streams constituting the second multiplexed stream is output from the buffer memories; and determining a multiplexing initial time of the second given multiplexed stream based on the end time, the first output time, the decoding cycle, and the second output time.

3. A recording medium for recording multiplexed data that has been formed by a data multiplexing method for multiplexing data for a reproducing apparatus which performs multiple-path reproduction by inputting given ones of a plurality of multiplexed streams that are based on different time bases to a decoding apparatus while switching among the given multiplexed streams at a given timing, wherein:

the recording medium records information for performing control so that a second given one of the plurality of multiplexed streams is supplied to respective memories of the decoding apparatus for storing a multiplexed stream such that capacities of the buffer memories are not exceeded, the capacities of the buffer memories being so set as to be able to store the second given multiplexed stream based on occupation amounts of the buffer memories which are detected in an end portion of a first given one of the plurality of multiplexed streams which precedes the second given multiplexed stream.

4. A recording medium for recording multiplexed data that has been formed by a data multiplexing method for multiplexing data for a reproducing apparatus which performs multiple-path reproduction by inputting given ones of a plurality of multiplexed streams that are based on different time bases to a decoding apparatus while switching among the given multiplexed streams at a given timing, wherein:

the recording medium records a multiplexing initial time of the second given multiplexed stream which has been determined based on an end time when supply of elementary streams constituting a first given one of the plurality of multiplexed streams which precedes the second given multiplexed stream to buffer memories of the decoding apparatus is finished, a first output time when a last access unit of all the elementary streams constituting the first given multiplexed stream is output from the buffer memories, a decoding cycle of access units, and a second output time when a first access unit of all the elementary streams constituting the second multiplexed stream is output from the buffer memories.

* * * * *